US008792209B2

(12) United States Patent
Sasaki et al.

(10) Patent No.: US 8,792,209 B2
(45) Date of Patent: Jul. 29, 2014

(54) MAGNETIC HEAD FOR PERPENDICULAR RECORDING HAVING A PLURALITY OF MAGNETIC PATH PORTIONS

(71) Applicants: Yoshitaka Sasaki, Santa Clara, CA (US); Hiroyuki Ito, Milpitas, CA (US); Kazuki Sato, Milpitas, CA (US); Shigeki Tanemura, Milpitas, CA (US); Hironori Araki, Milpitas, CA (US); Tatsuya Shimizu, Hong Kong (CN)

(72) Inventors: Yoshitaka Sasaki, Santa Clara, CA (US); Hiroyuki Ito, Milpitas, CA (US); Kazuki Sato, Milpitas, CA (US); Shigeki Tanemura, Milpitas, CA (US); Hironori Araki, Milpitas, CA (US); Tatsuya Shimizu, Hong Kong (CN)

(73) Assignees: Headway Technologies, Inc., Milpitas, CA (US); SAE Magnetics (H.K.) Ltd., Hong Kong (CN)

( * ) Notice: Subject to any disclaimer, the term of this patent is extended or adjusted under 35 U.S.C. 154(b) by 0 days.

(21) Appl. No.: 13/722,025

(22) Filed: Dec. 20, 2012

(65) Prior Publication Data

US 2014/0177099 A1   Jun. 26, 2014

(51) Int. Cl.
G11B 5/17       (2006.01)
G11B 5/127      (2006.01)
G11B 5/31       (2006.01)

(52) U.S. Cl.
CPC ........... G11B 5/1278 (2013.01); G11B 5/3123 (2013.01)
USPC .................................. 360/125.27; 360/123.06

(58) Field of Classification Search
CPC .. G11B 5/1278; G11B 5/3116; G11B 5/3163; G11B 5/3123

USPC ............ 360/123.02–123.12, 123.15–123.23, 360/123.38–123.44, 123.56, 125.17, 360/125.26–125.29, 125.67–125.7

See application file for complete search history.

(56) References Cited

U.S. PATENT DOCUMENTS

| | | | |
|---|---|---|---|
| 5,184,267 A * | 2/1993 | Mallary | 360/125.44 |
| 6,417,989 B1 * | 7/2002 | Yang | 360/121 |
| 6,954,340 B2 | 10/2005 | Shukh et al. | |
| 6,972,932 B2 * | 12/2005 | Shukh et al. | 360/317 |
| 2004/0066576 A1 * | 4/2004 | Lee et al. | 360/126 |
| 2005/0047011 A1 * | 3/2005 | Han et al. | 360/126 |
| 2008/0112080 A1 * | 5/2008 | Lengsfield et al. | 360/125.04 |
| 2008/0165452 A1 * | 7/2008 | Bozeman et al. | 360/319 |
| 2008/0180838 A1 * | 7/2008 | Im et al. | 360/125.03 |
| 2008/0316646 A1 * | 12/2008 | Na et al. | 360/123.05 |
| 2010/0061015 A1 * | 3/2010 | Tanida | 360/125.02 |
| 2010/0157462 A1 * | 6/2010 | Koizumi et al. | 360/71 |
| 2011/0041322 A1 * | 2/2011 | Sasaki et al. | 29/603.18 |

FOREIGN PATENT DOCUMENTS

JP      A-2001-93113      4/2001

* cited by examiner

*Primary Examiner* — Wayne Young
*Assistant Examiner* — Adam B Dravininkas
(74) *Attorney, Agent, or Firm* — Oliff PLC

(57) ABSTRACT

A magnetic head includes a coil, a main pole, a write shield, and a return path section. The return path section includes a yoke layer located on the front side in the direction of travel of a recording medium relative to the main pole, and a coupling part coupling the main pole and the yoke layer to each other. The coupling part includes a plurality of magnetic path portions that separate a magnetic flux into a plurality of fluxes and allow the fluxes to pass therethrough in parallel. The coil includes a plurality of winding portions disposed around the plurality of magnetic path portions, respectively.

8 Claims, 17 Drawing Sheets

MAGNETIC HEAD FOR PERPENDICULAR RECORDING HAVING A PLURALITY OF MAGNETIC PATH PORTIONS

BACKGROUND OF THE INVENTION

1. Field of the Invention

The present invention relates to a magnetic head for perpendicular magnetic recording that is used for writing data on a recording medium by means of a perpendicular magnetic recording system, and more specifically, to a magnetic head for perpendicular magnetic recording that has a main pole and a shield.

2. Description of the Related Art

The recording systems of magnetic read/write apparatuses include a longitudinal magnetic recording system wherein signals are magnetized in a direction along the plane of a recording medium (the longitudinal direction) and a perpendicular magnetic recording system wherein signals are magnetized in a direction perpendicular to the plane of a recording medium. It is known that the perpendicular magnetic recording system is harder to be affected by thermal fluctuation of the recording medium and capable of providing higher linear recording density, compared with the longitudinal magnetic recording system.

Magnetic heads for perpendicular magnetic recording typically have, like those for longitudinal magnetic recording, a structure where a read head unit having a magnetoresistive element (hereinafter, also referred to as MR element) for reading and a write head unit having an induction-type electromagnetic transducer for writing are stacked on a substrate. The write head unit includes a coil and a main pole. The main pole has an end face located in a medium facing surface facing a recording medium. The coil produces a magnetic field corresponding to data to be written on the recording medium. The main pole allows a magnetic flux corresponding to the magnetic field produced by the coil to pass, and produces a write magnetic field from its end face.

A magnetic head for use in a magnetic disk drive such as a hard disk drive is typically provided in a slider. The slider has the medium facing surface mentioned above. The medium facing surface has an air inflow end (a leading end) and an air outflow end (a trailing end). The slider is designed to slightly fly over the surface of a recording medium by means of an airflow that comes from the air inflow end into the space between the medium facing surface and the recording medium.

Here, the side of positions closer to the leading end relative to a reference position will be defined as the leading side, and the side of positions closer to the trailing end relative to the reference position will be defined as the trailing side. The leading side is the rear side in the direction of travel of the recording medium relative to the slider. The trailing side is the front side in the direction of travel of the recording medium relative to the slider.

The magnetic head is typically disposed near the trailing end of the medium facing surface of the slider. In a magnetic disk drive, positioning of the magnetic head is performed by a rotary actuator, for example. In this case, the magnetic head moves over the recording medium along a circular orbit about the center of rotation of the rotary actuator. In such a magnetic disk drive, a tilt of the magnetic head with respect to the tangent of the circular track, which is called a skew, occurs according to the position of the magnetic head across the tracks.

In particular, in a magnetic disk drive of the perpendicular magnetic recording system which is higher in capability of writing on a recording medium than the longitudinal magnetic recording system, the skew mentioned above can cause the phenomenon that signals already written on one or more tracks in the neighborhood of a track targeted for writing are erased or attenuated during writing of a signal on the track targeted for writing. In the present application, this phenomenon will be called unwanted erasure. Unwanted erasure includes adjacent track erasure (ATE) and wide-area track erasure (WATE). To achieve higher recording density, it is necessary to prevent unwanted erasure.

In order to prevent unwanted erasure induced by the skew and achieve higher recording density, it is effective to provide a write shield in the vicinity of the main pole. For example, U.S. Pat. No. 6,954,340 B2 discloses a magnetic head including a write shield having an end face that is located in the medium facing surface to wrap around an end face of the main pole.

A magnetic head including a write shield is typically provided with a return path section for connecting the write shield to a part of the main pole away from the medium facing surface. One or more spaces are formed between the return path section and the main pole. A coil or coils are provided to pass through the one or more spaces. The write shield and the return path section have the function of capturing a magnetic flux that is produced from the end face of the main pole and spreads in directions other than a direction perpendicular to the plane of the recording medium, so as to prevent the magnetic flux from reaching the recording medium. The write shield and the return path section also have the function of allowing a magnetic flux that has been produced from the end face of the main pole and has magnetized the recording medium to flow back to the main pole. A magnetic head having the write shield and the return path section is capable of preventing unwanted erasure and capable of providing further improved recording density.

The position of an end of a record bit to be recorded on a recording medium depends on the position of the trailing-side end of the end face of the main pole located in the medium facing surface. To define the position of the end of the record bit with high accuracy, it is therefore effective to form the end face of the write shield to include an end face portion located on the trailing side relative to the end face of the main pole.

As the frequency of write signals is increased in order to provide higher recording density, it is required of the magnetic head to provide an improved rate of change in the direction of the magnetic flux produced from the end face of the main pole. To satisfy this requirement in the magnetic head having a write shield, it is effective to form the end face of the write shield to include an end face portion located on the trailing side relative to the end face of the main pole. In addition to this, it is particularly effective to provide the return path section with a yoke layer located on the trailing side relative to the main pole and to reduce the length of a magnetic path that connects the write shield and the main pole to each other through the yoke layer. To that end, it is effective to reduce the number of turns of the coil passing through the space formed between the main pole and the yoke layer. However, this would cause a shortage of magnetomotive force produced by the coil, thereby hindering the main pole from producing a write magnetic field of sufficient magnitude.

As such, it has conventionally been difficult to allow the main pole to produce a write magnetic field of sufficient magnitude while reducing the length of a magnetic path that connects the write shield and the main pole to each other through a yoke layer located on the front side in the direction of travel of the recording medium (i.e., the trailing side) relative to the main pole.

OBJECT AND SUMMARY OF THE INVENTION

It is an object of the present invention to provide a magnetic head for perpendicular magnetic recording capable of producing a write magnetic field of sufficient magnitude from the main pole while reducing the length of a magnetic path that connects the write shield and the main pole to each other through a yoke layer located on the front side in the direction of travel of a recording medium relative to the main pole.

A magnetic head for perpendicular magnetic recording of the present invention includes a medium facing surface facing a recording medium, a coil producing a magnetic field corresponding to data to be written on the recording medium, a main pole, a write shield made of a magnetic material, a gap part made of a nonmagnetic material, and a return path section made of a magnetic material. The main pole has an end face located in the medium facing surface. The main pole allows a magnetic flux corresponding to the magnetic field produced by the coil to pass, and produces a write magnetic field for writing data on the recording medium by means of a perpendicular magnetic recording system. The write shield has an end face located in the medium facing surface. The gap part is interposed between the main pole and the write shield. The return path section connects the write shield and part of the main pole away from the medium facing surface to each other.

The end face of the write shield includes a first end face portion located on the front side in the direction of travel of the recording medium relative to the end face of the main pole. The return path section includes a first yoke layer located on the front side in the direction of travel of the recording medium relative to the main pole, and a first coupling part coupling the main pole and the first yoke layer to each other. The first coupling part includes a plurality of magnetic path portions that separate the magnetic flux into a plurality of fluxes and allow the fluxes to pass therethrough in parallel. The coil includes a plurality of winding portions that are disposed around the plurality of magnetic path portions, respectively.

In the magnetic head for perpendicular magnetic recording of the present invention, the plurality of magnetic path portions may intersect a cross section perpendicular to the direction of travel of the recording medium.

In the magnetic head for perpendicular magnetic recording of the present invention, at least one of the plurality of magnetic path portions is a specific magnetic path portion which is closest to the medium facing surface, and at least one of the plurality of winding portions is a specific winding portion which is disposed around the specific magnetic path portion. The specific winding portion may pass between the specific magnetic path portion and the medium facing surface only once.

In the magnetic head for perpendicular magnetic recording of the present invention, the return path section may further include a second yoke layer located on the rear side in the direction of travel of the recording medium relative to the main pole, and a second coupling part coupling the main pole and the second yoke layer to each other. The coil may further include a winding portion disposed around the second coupling part.

In the magnetic head for perpendicular magnetic recording of the present invention, the end face of the write shield may further include a second end face portion located on the rear side in the direction of travel of the recording medium relative to the end face of the main pole. In this case, the end face of the write shield may further include third and fourth end face portions located on opposite sides of the end face of the main pole in the track width direction.

In the magnetic head for perpendicular magnetic recording of the present invention, at least two of the plurality of magnetic path portions may be aligned in a direction perpendicular to the medium facing surface.

In the magnetic head for perpendicular magnetic recording of the present invention, at least two of the plurality of magnetic path portions may be aligned in the track width direction.

In the magnetic head for perpendicular magnetic recording of the present invention, the first coupling part includes the plurality of magnetic path portions, and the coil includes the plurality of winding portions disposed around the plurality of magnetic path portions, respectively. According to the present invention, each of the winding portions can be configured to have a small number of turns so as to achieve a reduction in length of the magnetic path connecting the write shield and the main pole to each other through the first yoke layer. Further, according to the present invention, since the coil includes a plurality of winding portions, the main pole is able to produce a write magnetic field of sufficient magnitude even if each of the winding portions has a small number of turns. Thus, the present invention makes it possible to allow the main pole to produce a write magnetic field of sufficient magnitude while reducing the length of the magnetic path connecting the write shield and the main pole to each other through the yoke layer located on the front side in the direction of travel of the recording medium relative to the main pole.

Other and further objects, features and advantages of the present invention will appear more fully from the following description.

DETAILED DESCRIPTION OF THE PREFERRED EMBODIMENTS

First Embodiment

Figure 1:
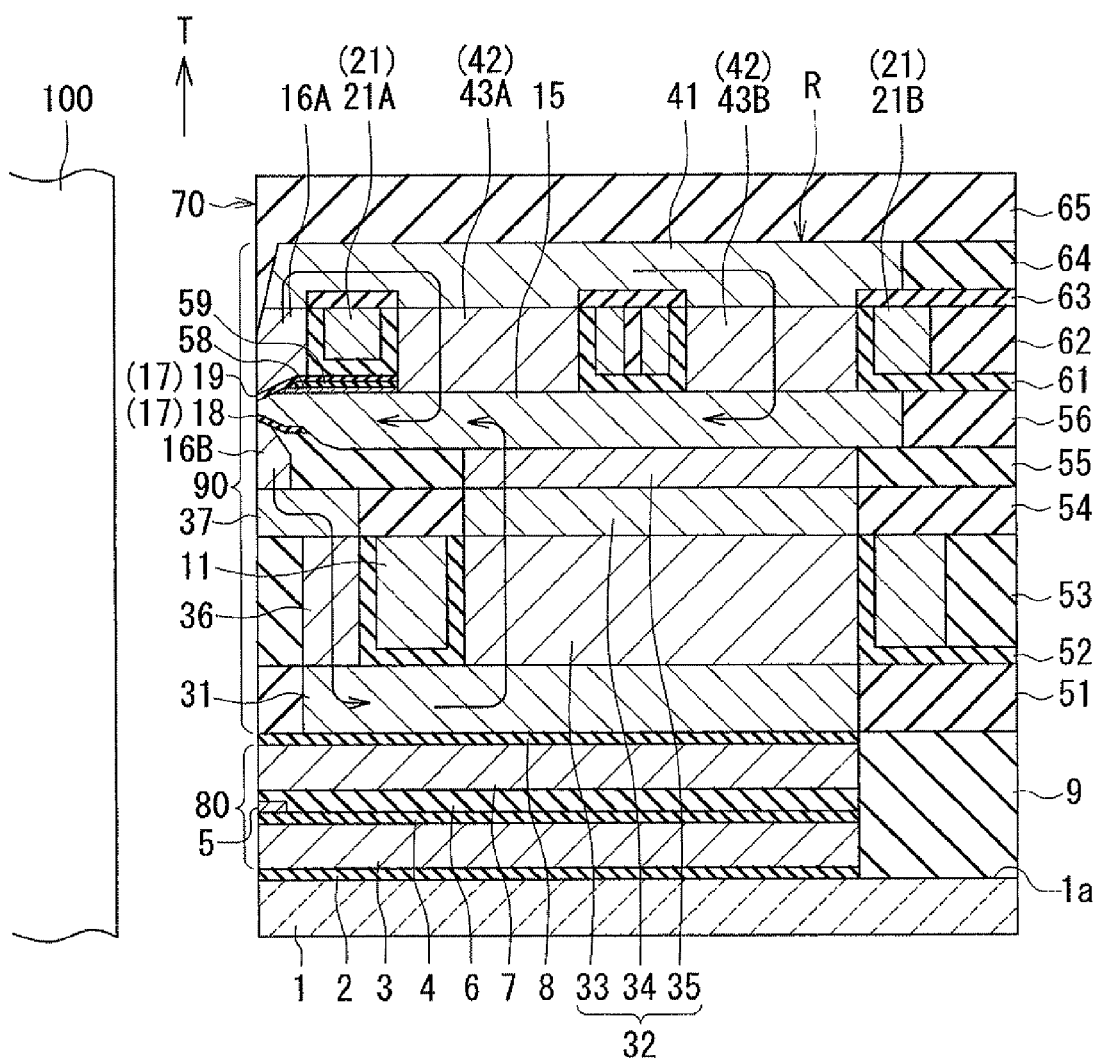
FIG. 1 is a cross-sectional view showing a magnetic head according to a first embodiment of the invention.
Figure 2:
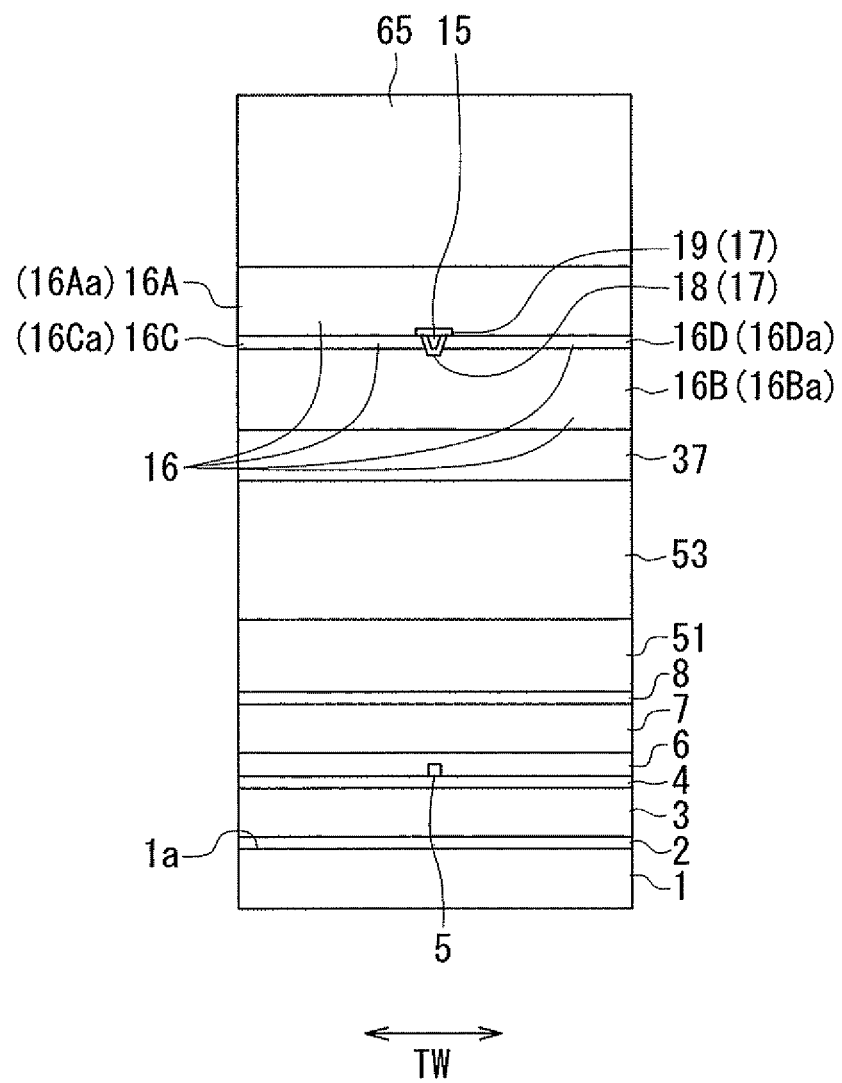
FIG. 2 is a front view showing the medium facing surface of the magnetic head according to the first embodiment of the invention.
Figure 3:
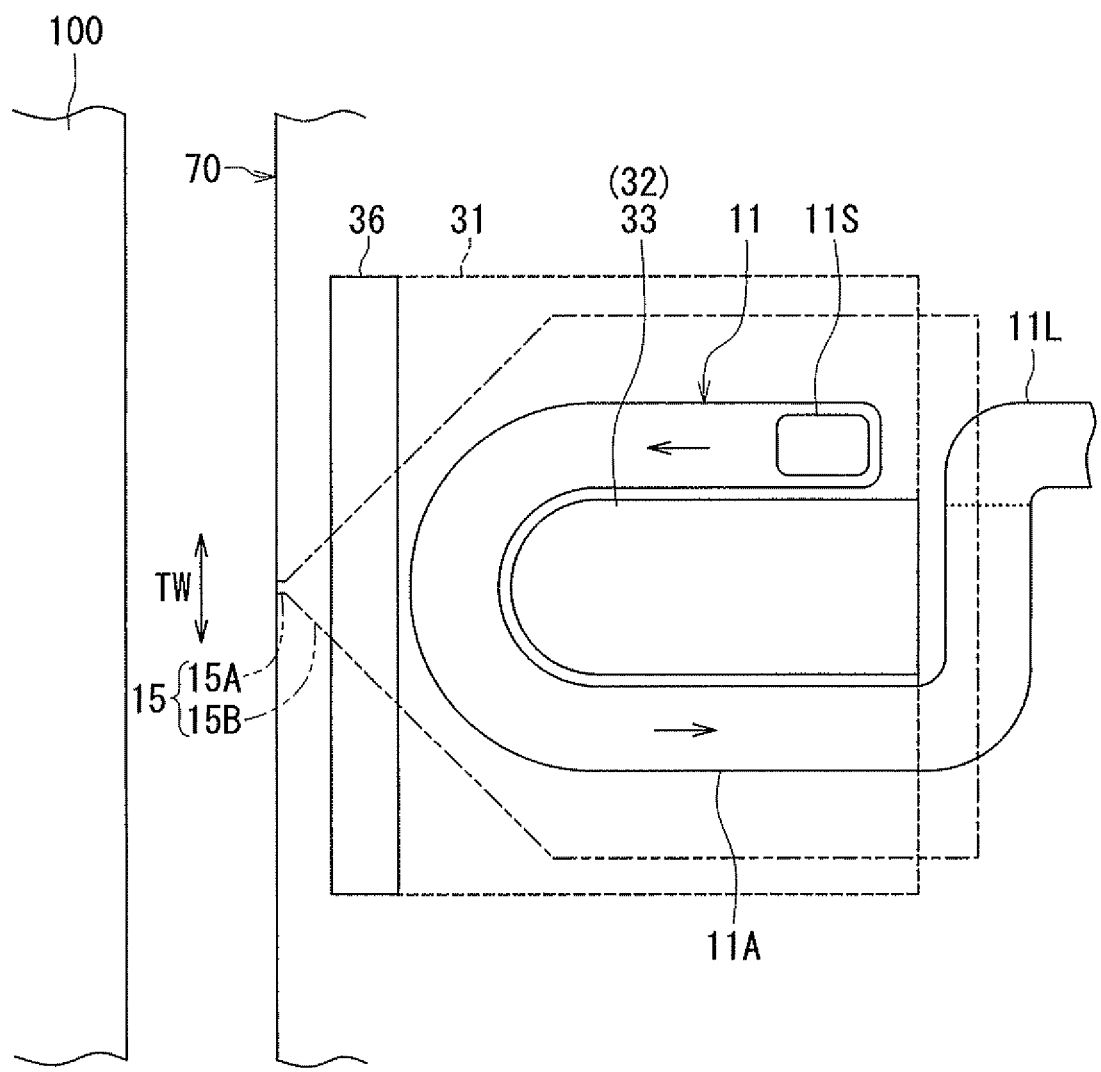
FIG. 3 is a plan view showing a second portion of a coil of the magnetic head according to the first embodiment of the invention.
Figure 4:
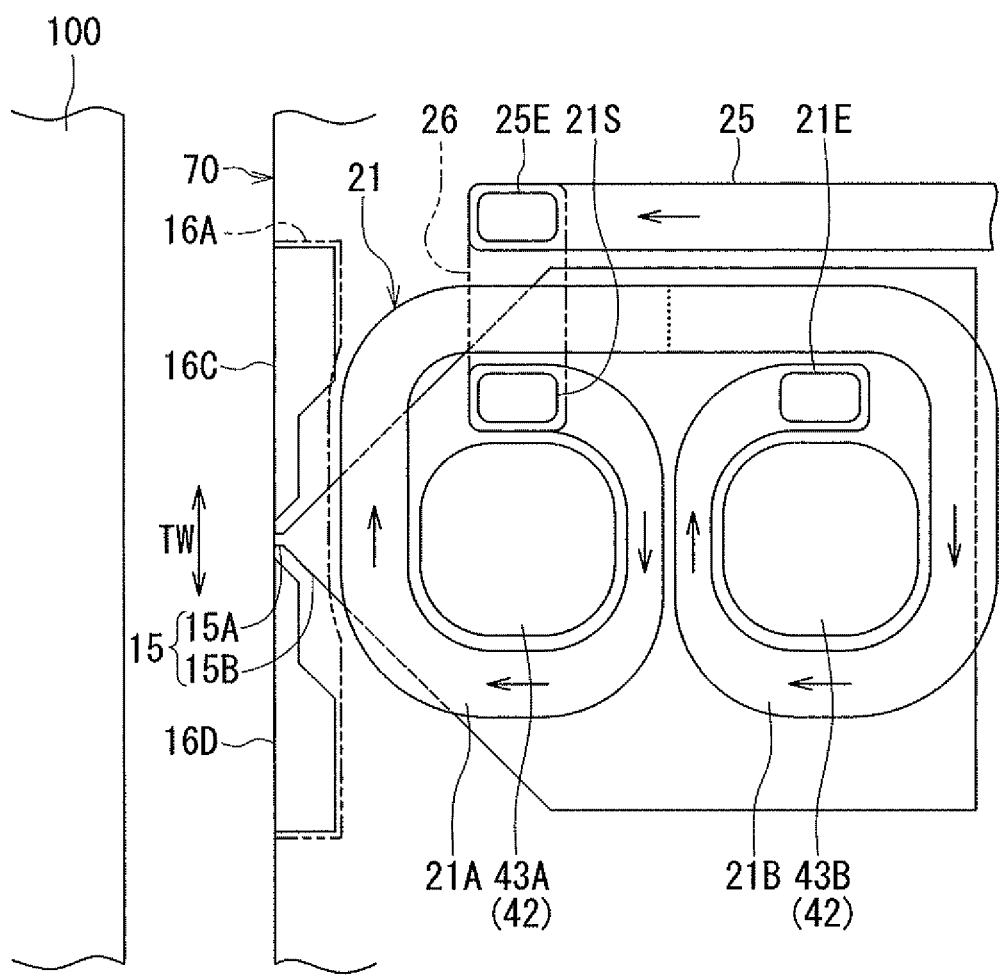
FIG. 4 is a plan view showing a first portion of the coil of the magnetic head according to the first embodiment of the invention.

Preferred embodiments of the present invention will now be described in detail with reference to the drawings. First, reference is made to FIG. 1 to FIG. 4 to describe the configuration of a magnetic head according to a first embodiment of the invention. FIG. 1 is a cross-sectional view showing the magnetic head according to the present embodiment. The arrow with the symbol T in FIG. 1 indicates the direction of travel of a recording medium. The arrows drawn within the magnetic head in FIG. 1 indicate the flows of magnetic flux. FIG. 2 is a front view showing the medium facing surface of the magnetic head according to the present embodiment. FIG. 3 is a plan view showing a second portion of a coil of the magnetic head according to the present embodiment. FIG. 4 is a plan view showing a first portion of the coil of the magnetic head according to the present embodiment. In each of FIG. 2 to FIG. 4, the arrow with the symbol TW indicates the track width direction. In each of FIG. 3 and FIG. 4, the arrows drawn within the coil indicate the direction of electric current flowing through the coil. Also in any other plan views illustrating a coil, arrows drawn within the coil indicate the direction of electric current flowing through the coil.

The magnetic head for perpendicular magnetic recording (hereinafter simply referred to as a magnetic head) according to the present embodiment is in the form of a slider to fly over the surface of a rotating recording medium. When the recording medium rotates, an airflow passing between the recording medium and the slider causes a lift to be exerted on the slider. The slider is configured to fly over the surface of the recording medium by means of the lift. As shown in FIG. 1, the magnetic head has a medium facing surface 70 facing a recording medium 100.

As shown in FIG. 1 and FIG. 2, the magnetic head includes: a substrate 1 made of a ceramic material such as aluminum oxide-titanium carbide ($Al_2O_3$-TiC) and having a top surface 1a; an insulating layer 2 made of an insulating material such as alumina ($Al_2O_3$) and disposed on the top surface 1a of the substrate 1; a bottom shield layer 3 made of a magnetic material and disposed on the insulating layer 2; a bottom shield gap film 4 which is an insulating film disposed to cover the bottom shield layer 3; a magnetoresistive (MR) element 5 serving as a read element disposed on the bottom shield gap film 4; a top shield gap film 6 which is an insulating film disposed on the MR element 5; and a top shield layer 7 made of a magnetic material and disposed on the top shield gap film 6.

An end of the MR element 5 is located in the medium facing surface 70. The MR element 5 may be an element made of a magneto-sensitive film that exhibits a magnetoresistive effect, such as an anisotropic magnetoresistive (AMR) element, a giant magnetoresistive (GMR) element, or a tunneling magnetoresistive (TMR) element. The GMR element may be of either the current-in-plane (CIP) type in which a current used for detecting magnetic signals is fed in a direction generally parallel to the planes of layers constituting the GMR element or the current-perpendicular-to-plane (CPP) type in which the current used for detecting magnetic signals is fed in a direction generally perpendicular to the planes of layers constituting the GMR element.

The parts from the bottom shield layer 3 to the top shield layer 7 constitute a read head unit 80. The magnetic head further includes nonmagnetic layers 8 and 9. The nonmagnetic layer 8 is disposed on the top shield layer 7. The nonmagnetic layer 9 is disposed on the top surface 1a of the substrate 1 and surrounds the read head unit 80 and the nonmagnetic layer 8. The top surfaces of the nonmagnetic layers 8 and 9 are even with each other. The nonmagnetic layers 8 and 9 are made of alumina, for example.

The magnetic head further includes a write head unit 90 disposed on the nonmagnetic layers 8 and 9. The write head unit 90 includes a coil, lead layers 25 and 26, a main pole 15, a write shield 16, a gap part 17, and a return path section R.

The coil produces a magnetic field corresponding to data to be written on the recording medium 100. The coil includes a first portion 21 and a second portion 11. The coil and the lead layers 25 and 25 are each made of a conductive material such as copper. The first portion 21 and the second portion 11 are connected in series or in parallel. The main pole 15 has an end face located in the medium facing surface 70. The main pole 15 allows a magnetic flux corresponding to the magnetic field produced by the coil to pass, and produces a write magnetic field for writing data on the recording medium 100 by means of a perpendicular magnetic recording system. FIG. 1 shows a cross section that intersects the end face of the main pole 15 located in the medium facing surface 70 and that is perpendicular to the medium facing surface 70 and to the top surface 1a of the substrate 1 (this cross section will hereinafter be referred to as the main cross section). The lead layers 25 and 26 are used for energizing the coil.

The write shield 16 has an end face located in the medium facing surface 70. As shown in FIG. 2, the end face of the write shield 16 includes first to fourth end face portions 16Aa, 16Ba, 16Ca, and 16Da. The first end face portion 16Aa is located on the front side in the direction T of travel of the recording medium 100 relative to the end face of the main pole 15. The second end face portion 16Ba is located on the rear side in the direction T of travel of the recording medium 100 relative to the end face of the main pole 15. The third and fourth end face portions 16Ca and 16Da are located on opposite sides of the end face of the main pole 15 in the track width direction TW. In the medium facing surface 70, the first to fourth end face portions 16Aa, 16Ba, 16Ca, and 16Da are arranged to wrap around the end face of the main pole 15.

The write shield 16 is made of a magnetic material. The material employed for the write shield 16 may be CoFeN, CoNiFe, NiFe, or CoFe, for example.

The return path section R includes a first yoke layer 41, a second yoke layer 31, a first coupling part 42, a second coupling part 32, and magnetic layers 36 and 37. The first yoke layer 41 is located on the front side in the direction T of travel of the recording medium 100 relative to the main pole 15, and connected to the write shield 16. The first coupling part 42 couples the first yoke layer 41 and the main pole 15 to each other. The second yoke layer 31 is located on the rear side in the direction T of travel of the recording medium 100 relative to the main pole 15. The second coupling part 32 includes magnetic layers 33, 34 and 35, and couples the main pole 15 and the second yoke layer 31 to each other. The magnetic layers 36 and 37 couple the write shield 16 and the second yoke layer 31 to each other.

The return path section R is made of a magnetic material. The material employed for the return path section R may be CoFeN, CoNiFe, NiFe, or CoFe, for example.

The second yoke layer 31 is located on the nonmagnetic layer 8. The magnetic layers 33 and 36 are both located on the second yoke layer 31. The magnetic layer 36 is located near the medium facing surface 70. The magnetic layer 33 is located farther from the medium facing surface 70 than is the magnetic layer 36. Each of the second yoke layer 31 and the magnetic layer 36 has an end face facing toward the medium facing surface 70 and located at a distance from the medium facing surface 70. As shown in FIG. 3, the second portion 11 of the coil is wound approximately one turn around the magnetic layer 33.

The magnetic head further includes an insulating layer 51 made of an insulating material, disposed on the nonmagnetic layers 8 and 9 and surrounding the second yoke layer 31, an insulating film 52 made of an insulating material and isolating the second portion 11 from the second yoke layer 31 and the magnetic layers 33 and 36, and an insulating layer 53 made of an insulating material and disposed around the second portion 11 and the magnetic layer 36. The top surfaces of the second portion 11, the magnetic layers 33 and 36, the insulating film 52 and the insulating layer 53 are even with each other. The insulating layers 51 and 53 and the insulating film 52 are made of alumina, for example.

The magnetic layer 34 is located on the magnetic layer 33. The magnetic layer 37 is located on the magnetic layer 36 and the insulating layer 53. The magnetic layer 37 has an end face located in the medium facing surface 70. The magnetic head further includes an insulating layer 54 made of an insulating material. The insulating layer 54 lies on the second portion 11, the insulating film 52 and the insulating layer 53, and surrounds the magnetic layers 34 and 37. The insulating layer 54 is made of alumina, for example.

As shown in FIG. 2, the write shield 16 includes a first shield 16A, a second shield 16B, and two side shields 16C and 16D. The two side shields 16C and 16D are located on opposite sides of the main pole 15 in the track width direction TW. The first shield 16A is located on the front side in the direction T of travel of the recording medium 100 relative to the main pole 15. The second shield 16B is located on the rear side in the direction T of travel of the recording medium 100 relative to the main pole 15. The side shields 16C and 16D magnetically couple the first shield 16A and the second shield 16B to each other.

As shown in FIG. 1 and FIG. 2, the first shield 16A has the first end face portion 16Aa, and also has a top surface, a bottom surface, and a connecting surface connecting the first end face portion 16Aa and the top surface to each other. The distance from the medium facing surface 70 to an arbitrary point on the connecting surface of the first shield 16A increases with increasing distance from the arbitrary point to the top surface 1a of the substrate 1. The second shield 16B has the second end face portion 16Ba, and also has a top surface and a bottom surface. The distance from the top surface 1a of the substrate 1 to an arbitrary point on the top surface of the second shield 16B decreases with increasing distance from the arbitrary point to the medium facing surface 70. As shown in FIG. 2, the side shield 16C has the third end face portion 16Ca. The side shield 16D has the fourth end face portion 16Da.

The second shield 16B is located on the magnetic layer 37. The magnetic layer 35 is located on the magnetic layer 34. The magnetic head further includes a nonmagnetic layer 55 made of a nonmagnetic material. The nonmagnetic layer 55 is located on part of the top surface of the magnetic layer 37 and on the top surface of the insulating layer 54, and surrounds the second shield 16B and the magnetic layer 35. The nonmagnetic layer 55 is made of alumina, for example.

The main pole 15 has a top surface (see FIG. 1), which is the surface located at a forward end in the direction T of travel of the recording medium 100, and has a bottom end (see FIG. 1) opposite to the top surface. The main pole 15 further has first and second side parts (see FIG. 2) that are opposite to each other in the track width direction TW. The side shield 16C has a first sidewall opposed to the first side part of the main pole 15. The side shield 16D has a second sidewall opposed to the second side part of the main pole 15.

The gap part 17 is interposed between the main pole 15 and the write shield 16. The magnetic head further includes a first gap layer 19 made of a nonmagnetic material and a second gap layer 18 made of a nonmagnetic material. A portion of the first gap layer 19 constitutes a portion of the gap part 17. A portion of the second gap layer 18 constitutes another portion of the gap part 17. The portion of the first gap layer 19 constituting the portion of the gap part 17 is located between the main pole 15 and the first shield 16A. The portion of the second gap layer 18 constituting the other portion of the gap part 17 is located between the main pole 15 and each of the second shield 16B and the side shields 16C and 16D.

The side shields 16C and 16D are located on the second shield 16B and in contact with the top surface of the second shield 16B. The second gap layer 18 is arranged to extend along the sidewalls of the side shields 16C and 16D, the top surface of the second shield 16B, and part of the top surface of the nonmagnetic layer 55. The nonmagnetic material employed to form the second gap layer 18 may be an insulating material or a nonmagnetic metal material. Alumina is an example of an insulating material that can be employed to form the second gap layer 18. Ru is an example of a nonmagnetic metal material that can be employed to form the second gap layer 18.

The main pole 15 is disposed on the second shield 16B and the nonmagnetic layer 55 such that the second gap layer 18 is interposed between the main pole 15 and each of the top surface of the second shield 16B and part of the top surface of the nonmagnetic layer 55. As shown in FIG. 2, the second gap layer 18 is interposed also between the main pole 15 and each of the side shields 16C and 16D.

A part of the bottom end of the main pole 15 away from the medium facing surface 70 is in contact with the top surface of the magnetic layer 35. The main pole 15 is made of a magnetic metal material. The material of the main pole 15 may be one of NiFe, CoNiFe, and CoFe, for example. The shape of the main pole 15 will be described in detail later.

The magnetic head further includes a nonmagnetic layer 56 made of a nonmagnetic material and disposed around the main pole 15 and the side shields 16C and 16D. In the present embodiment, the nonmagnetic layer 56 is made of a nonmagnetic insulating material such as alumina, in particular.

The magnetic head further includes a nonmagnetic metal layer 58 made of a nonmagnetic metal material, located at a distance from the medium facing surface 70 and lying on a part of the top surface of the main pole 15, and an insulating layer 59 made of an insulating material and lying on the top surface of the nonmagnetic metal layer 58. The nonmagnetic metal layer 58 is made of Ru, NiCr, or NiCu, for example. The insulating layer 59 is made of alumina, for example.

The first gap layer 19 is disposed to cover the main pole 15, the nonmagnetic metal layer 58 and the insulating layer 59. The first gap layer 19 may be made of a nonmagnetic insulating material such as alumina or a nonmagnetic conductive material such as Ru, NiCu, Ta, W, NiB, or NiP.

The first shield 16A is disposed over the side shields 16C and 16D and the first gap layer 19, and is in contact with the top surfaces of the side shields 16C and 16D and the first gap layer 19. In the medium facing surface 70, part of the first end face portion 16Aa of the first shield 16A is separated from the end face of the main pole 15 by a predetermined distance created by the thickness of the first gap layer 19. The thickness of the first gap layer 19 preferably falls within the range of 5 to 60 nm, and may be 30 to 60 nm, for example. The end face of the main pole 15 has a side that is adjacent to the first gap layer 19, and the side defines the track width.

The first coupling part 42 is located on the main pole 15 and away from the medium facing surface 70. The first coupling part 42 includes a plurality of magnetic path portions. In the present embodiment, the first coupling part 42 includes two magnetic path portions 43A and 43B as the plurality of magnetic path portions. The two magnetic path portions 43A and 43B are aligned in a direction perpendicular to the medium facing surface 70. Hereinafter, any magnetic path portion will be represented by reference numeral 43.

As shown in FIG. 4, the first portion 21 includes a plurality of winding portions that are disposed around the plurality of magnetic path portions 43, respectively. The lead layer 25 is located farther from the main cross section than is the first portion 21, and extends perpendicularly to the medium facing surface 70. The lead layer 25 has a connection part 25E electrically connected to the lead layer 26. The magnetic head further includes an insulating film 61 and an insulating layer 62 each made of an insulating material. The insulating film 61 isolates the first portion 21 from the first shield 16A, the first gap layer 19 and the plurality of magnetic path portions 43. The insulating layer 62 is disposed around the first portion 21, the lead layer 25 and the first shield 16A. The top surfaces of the first portion 21, the lead layer 25, the first shield 16A, the plurality of magnetic path portions 43, the insulating film 61 and the insulating layer 62 are even with each other. The insulating film 61 and the insulating layer 62 are made of alumina, for example.

The magnetic head further includes an insulating layer 63 made of an insulating material and disposed over the top surfaces of the first portion 21, the lead layer 25, the insulating film 61 and the insulating layer 62. Although not illustrated, the insulating film 63 has an opening for exposing part of the first portion 21 and an opening for exposing the connection part 25E of the lead layer 25. The lead layer 26 is disposed on the insulating layer 63 and electrically connected to the part of the first portion 21 and the connection part 25E of the lead layer 25 through the aforementioned openings. The insulating layer 63 is made of alumina, for example.

The first yoke layer 41 is disposed over the first shield 16A, the first coupling part 42 and the insulating layer 63, and connects the first shield 16A and the first coupling part 42 to each other. The first yoke layer 41 has an end face facing toward the medium facing surface 70 and located at a distance from the medium facing surface 70. The distance from the medium facing surface 70 to an arbitrary point on the end face of the first yoke layer 41 increases with increasing distance from the arbitrary point to the top surface 1a of the substrate 1.

The magnetic head further includes an insulating layer 64 made of an insulating material and disposed around the first yoke layer 41. The insulating layer 64 is made of alumina, for example.

The magnetic head further includes a protective layer 65 made of a nonmagnetic material and disposed to cover the write head unit 90. The protective layer 65 is made of, for example, an inorganic insulating material such as alumina.

As has been described, the magnetic head according to the present embodiment includes the medium facing surface 70, the read head unit 80, and the write head unit 90. The read head unit 80 and the write head unit 90 are stacked on the substrate 1. The read head unit 80 is located on the rear side in the direction T of travel of the recording medium 100 (i.e., the leading side) relative to the write head unit 90.

The write head unit 90 includes the coil including the first portion 21 and the second portion 11, the lead layers 25 and 26, the main pole 15, the write shield 16, the gap part 17, and the return path section R. The return path section R includes the first yoke layer 41, the second yoke layer 31, the first coupling part 42, the second coupling part 32, and the magnetic layers 36 and 37.

As shown in FIG. 1, the first yoke layer 41 and the first coupling part 42 form a first magnetic path that is located on the front side in the direction T of travel of the recording medium 100 relative to the main pole 15 and connects the write shield 16 and part of the main pole 15 away from the medium facing surface 70 to each other. The first coupling part 42 includes the plurality of magnetic path portions 43. The plurality of magnetic path portions 43 separate a magnetic flux corresponding to the magnetic field produced by the first portion 21 into a plurality of fluxes and allow the fluxes to pass therethrough in parallel.

FIG. 4 shows a cross section perpendicular to the direction T of travel of the recording medium 100. In the present embodiment, the plurality of magnetic path portions 43 intersect a cross section perpendicular to the direction T of travel of the recording medium 100, such as one shown in FIG. 4.

As shown in FIG. 1, the second yoke layer 31, the second coupling part 32 (the magnetic layers 33 to 35), and the magnetic layers 36 and 37 form a second magnetic path that is located on the rear side in the direction T of travel of the recording medium 100 relative to the main pole 15 and connects the write shield 16 and part of the main pole 15 away from the medium facing surface 70 to each other. The main pole 15, the gap part 17 (part of the gap layer 18), the write shield 16 and the second magnetic path form a space enclosed by these components. The second portion 11 of the coil passes through the space.

The write shield 16 captures a disturbance magnetic field applied to the magnetic head from the outside thereof. This makes it possible to prevent erroneous writing on the recording medium 100 induced by the disturbance magnetic field intensively captured into the main pole 15. The write shield 16 also has the function of capturing a magnetic flux produced from the end face of the main pole 15 and spreading in directions other than a direction perpendicular to the plane of the recording medium 100, so as to prevent the magnetic flux from reaching the recording medium 100. The write shield 16 and the return path section R have the function of allowing a magnetic flux that has been produced from the end face of the main pole 15 and has magnetized the recording medium 100 to flow back.

Now, the first portion 21 and the second portion 11 of the coil will be described in detail with reference to FIG. 3 and FIG. 4. FIG. 3 is a plan view showing the second portion 11. The second portion 11 includes a winding portion 11A disposed around the magnetic layer 33 which constitutes part of the second coupling part 32, and a lead portion 11L contiguous with the winding portion 11A. In FIG. 3, the boundary between the winding portion 11A and the lead portion 11L is shown by a dotted line. The winding portion 11A is wound approximately one turn around the magnetic layer 33. The winding portion 11A has a coil connection part 11S electrically connected to the first portion 21. As viewed from above, the winding portion 11A is wound in a counterclockwise direction from the coil connection part 11S toward the boundary between the winding portion 11A and the lead portion 11L.

FIG. 4 is a plan view showing the first portion 21. The first portion 21 includes a plurality of winding portions disposed around the plurality of magnetic path portions 43, respectively. In the example shown in FIG. 4, the first portion 21 includes two winding portions 21A and 21B. The winding portion 21A is disposed around the magnetic path portion 43A. The winding portion 21B is contiguous with the winding portion 21A and disposed around the magnetic path portion 43B. In FIG. 4, the boundary between the winding portion 21A and the winding portion 21B is shown by a dotted line. The winding portion 21A is wound approximately one turn around the magnetic path portion 43A. The winding portion 21B is wound approximately one turn around the magnetic path portion 43B.

Of the plurality of magnetic path portions 43, at least one magnetic path portion that is closest to the medium facing surface 70 will be referred to as a specific magnetic path portion. Of the plurality of winding portions of the first portion 21, at least one winding portion disposed around at least one specific magnetic path portion will be referred to as a specific winding portion. In the present embodiment, the magnetic path portion 43A is the specific magnetic path portion, and the winding portion 21A is the specific winding portion. The specific winding portion 21A passes between the specific magnetic path portion 43A and the medium facing surface 70 only once.

The winding portion 21A has a coil connection part 21S electrically connected to the lead layer 26. The winding portion 21B has a coil connection part 21E electrically connected to the coil connection part 11S of the winding portion 11A of the second portion 11. As viewed from above, the winding portion 21A is wound in a clockwise direction from the coil connection part 21S toward the boundary between the winding portions 21A and 21B. As viewed from above, the winding portion 21B is wound in a clockwise direction from the boundary between the winding portions 21A and 21B toward the coil connection part 21E.

The coil connection part 21S is electrically connected to the connection part 25E of the lead layer 25 via the lead layer 26. The coil connection part 21E is electrically connected to the coil connection part 11S via a non-illustrated connection layer that penetrates a plurality of layers interposed between the first portion 21 and the second portion 11. The connection layer is made of a conductive material such as copper. In the example shown in FIG. 3 and FIG. 4, the first portion 21 and the second portion 11 are connected in series. A magnetic flux corresponding to the magnetic field produced by the first portion 21 and a magnetic flux corresponding to the magnetic field produced by the second portion 11 pass through the return path section R and the main pole 15. Note that the first portion 21 and the second portion 11 may be connected in parallel.

The shape of the main pole 15 will now be described in detail with reference to FIG. 1 to FIG. 4. As shown in FIG. 1 and FIG. 2, the main pole 15 has the top surface located at the forward end in the direction T of travel of the recording medium 100, the bottom end opposite to the top surface, the first side part, and the second side part. Further, as shown in FIG. 3 and FIG. 4, the main pole 15 includes a track width defining portion 15A and a wide portion 15B. The track width defining portion 15A has an end face located in the medium facing surface 70 and an end portion opposite to the end face. The wide portion 15B has a front end portion connected to the end portion of the track width defining portion 15A, and a rear end portion opposite thereto. The top surface of the main pole 15 includes the top surface of the track width defining portion 15A and the top surface of the wide portion 15B. The top surface of the wide portion 15B is greater than the top surface of the track width defining portion 15A in width in the track width direction TW.

The width of the top surface of the track width defining portion 15A in the track width direction TW is generally constant regardless of the distance from the medium facing surface 70. The width of the top surface of the wide portion 15B in the track width direction TW is, for example, equal to that of the top surface of the track width defining portion 15A at the boundary between the track width defining portion 15A and the wide portion 15B, and gradually increases with increasing distance from the medium facing surface 70, then becoming constant. Here, the length of the track width defining portion 15A in a direction perpendicular to the medium facing surface 70 will be referred to as the neck height. The neck height falls within the range of 0 to 0.3 µM, for example. A zero neck height means that there is no track width defining portion 15A and thus the wide portion 15B has an end face located in the medium facing surface 70.

The top surface of the main pole 15 includes an inclined portion and a flat portion arranged in this order, the inclined portion being closer to the medium facing surface 70. The inclined portion has a first end located in the medium facing surface 70 and a second end opposite thereto. The flat portion is connected to the second end of the inclined portion. The inclined portion is inclined such that its second end is located on the front side in the direction T of travel of the recording medium 100 relative to its first end. The flat portion extends in a direction substantially perpendicular to the medium facing surface 70. The bottom surface of the first shield 16A includes a portion that is opposed to the inclined portion of the top surface of the main pole 15 with the first gap layer 19 interposed therebetween.

The bottom end of the main pole 15 includes a first inclined portion, a first flat portion, a second inclined portion, and a second flat portion arranged in this order, the first inclined portion being closest to the medium facing surface 70. The first inclined portion has a first end located in the medium facing surface 70 and a second end opposite thereto. The first flat portion is connected to the second end of the first inclined portion. The second inclined portion has a first end connected to the first flat portion and a second end that is located farther from the medium facing surface 70 than is the first end. Each of the first inclined portion, the first flat portion and the second inclined portion may be an edge formed by two intersecting planes, or may be a plane connecting two planes to each other. The second flat portion is a plane connected to the second end of the second inclined portion. The first and second inclined portions are inclined such that their respective second ends are located on the rear side in the direction T of travel of the recording medium 100 relative to their respective first ends. The first and second flat portions extend in a direction substantially perpendicular to the medium facing surface 70.

The end face of the main pole 15 located in the medium facing surface 70 has a first side adjacent to the first gap layer 19, a second side connected to one end of the first side, and a third side connected to the other end of the first side. The first side defines the track width. The position of an end of a record bit to be recorded on the recording medium 100 depends on the position of the first side. The width in the track width direction TW of the end face of the main pole 15 located in the medium facing surface 70 decreases with increasing distance from the first side, that is, with increasing proximity to the top surface 1a of the substrate 1. Each of the second side and the third side forms an angle of, for example, 7° to 17°, or preferably 10° to 15°, relative to a direction perpendicular to the top surface 1a of the substrate 1. The first side has a length in the range of 0.05 to 0.20 μm, for example.

A description will now be given of the specific function and effects of the magnetic head according to the present embodiment. As the frequency of write signals is increased in order to provide higher recording density, the magnetic head is required to be improved in the rate of change in the direction of the magnetic flux produced from the end face of the main pole 15. The position of an end of a record bit depends on the position of an end of the end face of the main pole 15 located in the medium facing surface 70, the end being located on the front side in the direction T of travel of the recording medium 100. To provide higher recording density, it is therefore required to improve the rate of change in the direction of the magnetic flux produced from the end face of the main pole 15 and also the rate of change in the direction of the magnetic flux passing through the first shield 16A of the write shield 16. To meet these requirements, it is effective to reduce the length of the first magnetic path connecting the write shield 16 and the main pole 15 to each other through the first yoke layer 41.

In the present embodiment, the first coupling part 42 coupling the main pole 15 and the first yoke layer 41 to each other includes the magnetic path portions 43A and 43B, and the first portion 21 of the coil includes the winding portions 21A and 21B disposed around the magnetic path portions 43A and 43B, respectively. According to the present embodiment, each of the winding portions 21A and 21B of the first portion 21 is formed to have a small number of turns to allow a reduction in length of the first magnetic path. Consequently, it is possible to improve both the rate of change in the direction of the magnetic flux produced from the end face of the main pole 15 and the rate of change in the direction of the magnetic flux passing through the first shield 16A, thereby allowing the enhancement of recording density. Further, according to the present embodiment, since the first portion 21 includes the plurality of winding portions 21A and 21B, the main pole 15 is able to produce a write magnetic field of sufficient magnitude even if each of the winding portions 21A and 21B has a small number of turns.

In the present embodiment, each of the winding portions 21A and 21B is wound approximately one turn, in particular. Here, consider a magnetic head of a comparative example configured so that the magnetic path portion 43B and the winding portion 21B are eliminated and the number of turns of the winding portion 21A is two. The remainder of configuration of the magnetic head of the comparative example is the same as that of the magnetic head according to the present embodiment. The total magnetomotive force produced by the winding portions 21A and 21B of the present embodiment is approximately equal to the magnetomotive force produced by the winding portion 21A of the magnetic head of the comparative example. On the other hand, the present embodiment allows the first magnetic path to be smaller in length because the number of turns of the winding portion 21A is smaller than that in the magnetic head of the comparative example. The present embodiment thus allows a reduction in length of the first magnetic path compared with that in the magnetic head of the comparative example while allowing the magnitude of the write magnetic field produced by the main pole 15 to be equivalent to that in the magnetic head of the comparative example.

Further, the present embodiment is provided with the second magnetic path and the second portion 11 of the coil, in addition to the first magnetic path and the first portion 21 of the coil. The second magnetic path connects the write shield 16 and the main pole 15 to each other through the second yoke layer 41. Thus, according to the present embodiment, even if the number of turns of each winding portion of the first portion 21 is reduced to reduce the length of the first magnetic path, the magnetomotive forces of the first portion 21 and the second portion 11 allow the main pole 15 to produce a write magnetic field of sufficient magnitude.

As can be seen from the foregoing, the present embodiment makes it possible to produce a write magnetic field of sufficient magnitude from the main pole 15 while allowing a reduction in length of the first magnetic path.

Further, in the present embodiment, the plurality of magnetic path portions 43 intersect a cross section perpendicular to the direction T of travel of the recording medium 100. The present embodiment thus allows the plurality of winding portions of the first portion 21 to be located in one plane parallel to the aforementioned cross section. Consequently, according to the present embodiment, it is possible to form the plurality of winding portions of the first portion 21 easily.

Second Embodiment

Figure 5:
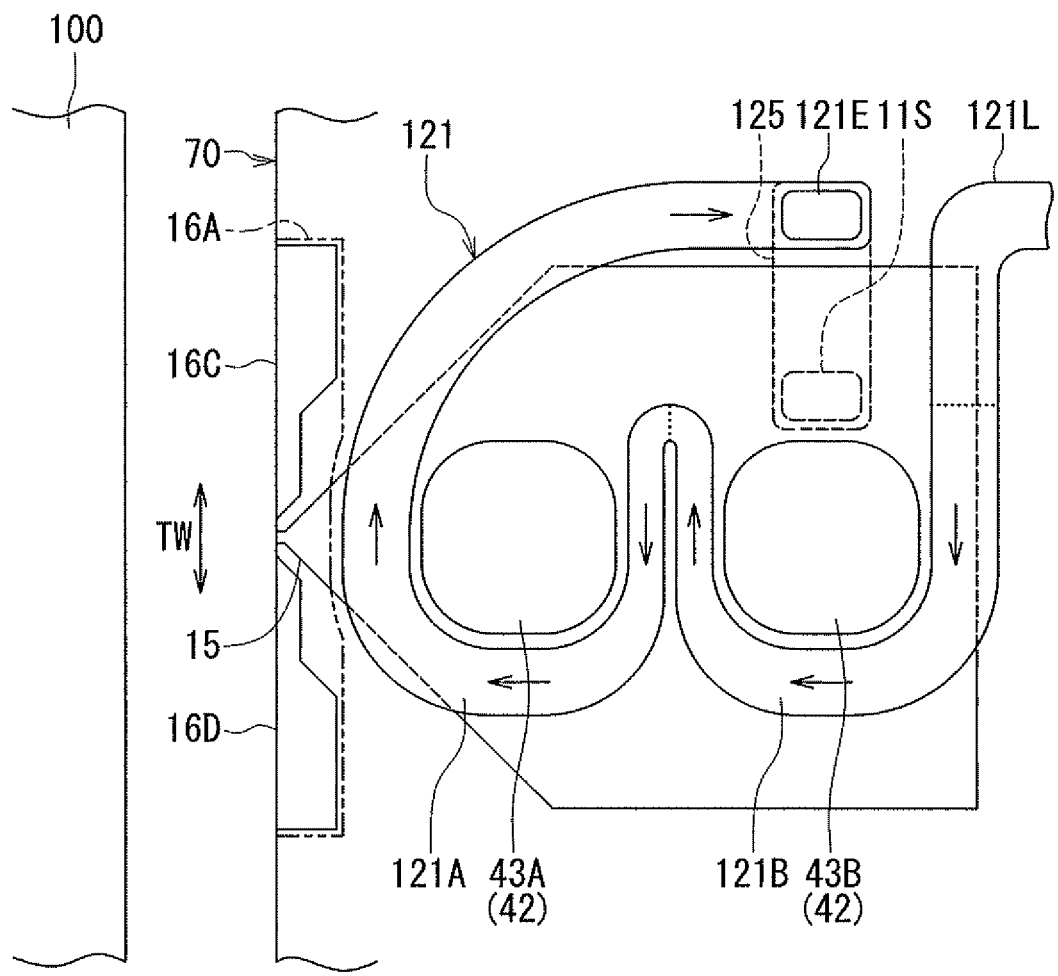
FIG. 5 is a plan view showing a first portion of a coil of a magnetic head according to a second embodiment of the invention.

A magnetic head according to a second embodiment of the invention will now be described with reference to FIG. 5. FIG. 5 is a plan view showing a first portion of the coil of the magnetic head according to the present embodiment. The magnetic head according to the present embodiment is different from the magnetic head according to the first embodiment in the following ways. The magnetic head according to the present embodiment has a lead layer 125 in place of the lead layers 25 and 26 of the first embodiment. The lead layer 125 is made of a conductive material such as copper.

Further, in the present embodiment, the coil includes a first portion 121 in place of the first portion 21 of the first embodiment. The positional relationship of the first portion 121 with the main pole 15, the write shield 16 and the return path section R is the same as that of the first portion 21 of the first embodiment. The plurality of magnetic path portions 43 of the return path section R separate a magnetic flux corresponding to the magnetic field produced by the first portion 121 into a plurality of fluxes and allow the fluxes to pass therethrough in parallel. The insulating film 61 and the insulating layers 62 and 63 (see FIG. 1) are disposed around the first portion 121.

The first portion 121 includes two winding portions 121A and 121B and a lead portion 121L. The winding portion 121A is disposed around the magnetic path portion 43A. The winding portion 121B is contiguous with the winding portion 121A and disposed around the magnetic path portion 43B. The lead portion 121L is contiguous with the winding portion 121B. In FIG. 5, the boundaries between these portions are shown by dotted lines. The winding portion 121A is wound approximately one turn around the magnetic path portion 43A. The winding portion 121B is wound approximately one turn around the magnetic path portion 43B.

In the present embodiment, the winding portion 121A is the specific winding portion. The specific winding portion 121A passes between the specific magnetic path portion 43A and the medium facing surface 70 only once.

The winding portion 121A has a coil connection part 121E electrically connected to the lead layer 125. As viewed from above, the winding portion 121A is wound in a clockwise direction from the boundary between the winding portions 121A and 121B toward the coil connection part 121E. As viewed from above, the winding portion 121B is wound in a clockwise direction from the boundary between the winding portion 121B and the lead portion 121L toward the boundary between the winding portions 121A and 121B.

The lead layer 125 is embedded, for example, in the insulating layer 54 (see FIG. 1) and electrically connected to the coil connection part 11S of the second portion 11 of the coil. The coil connection part 121E is electrically connected to the lead layer 125 via a non-illustrated connection layer that penetrates a plurality of layers interposed between the first portion 121 and the lead layer 125. In the example shown in FIG. 5, the first portion 121 and the second portion 11 are connected in series.

The remainder of configuration, function and effects of the present embodiment are similar to those of the first embodiment.

Third Embodiment

Figure 6:
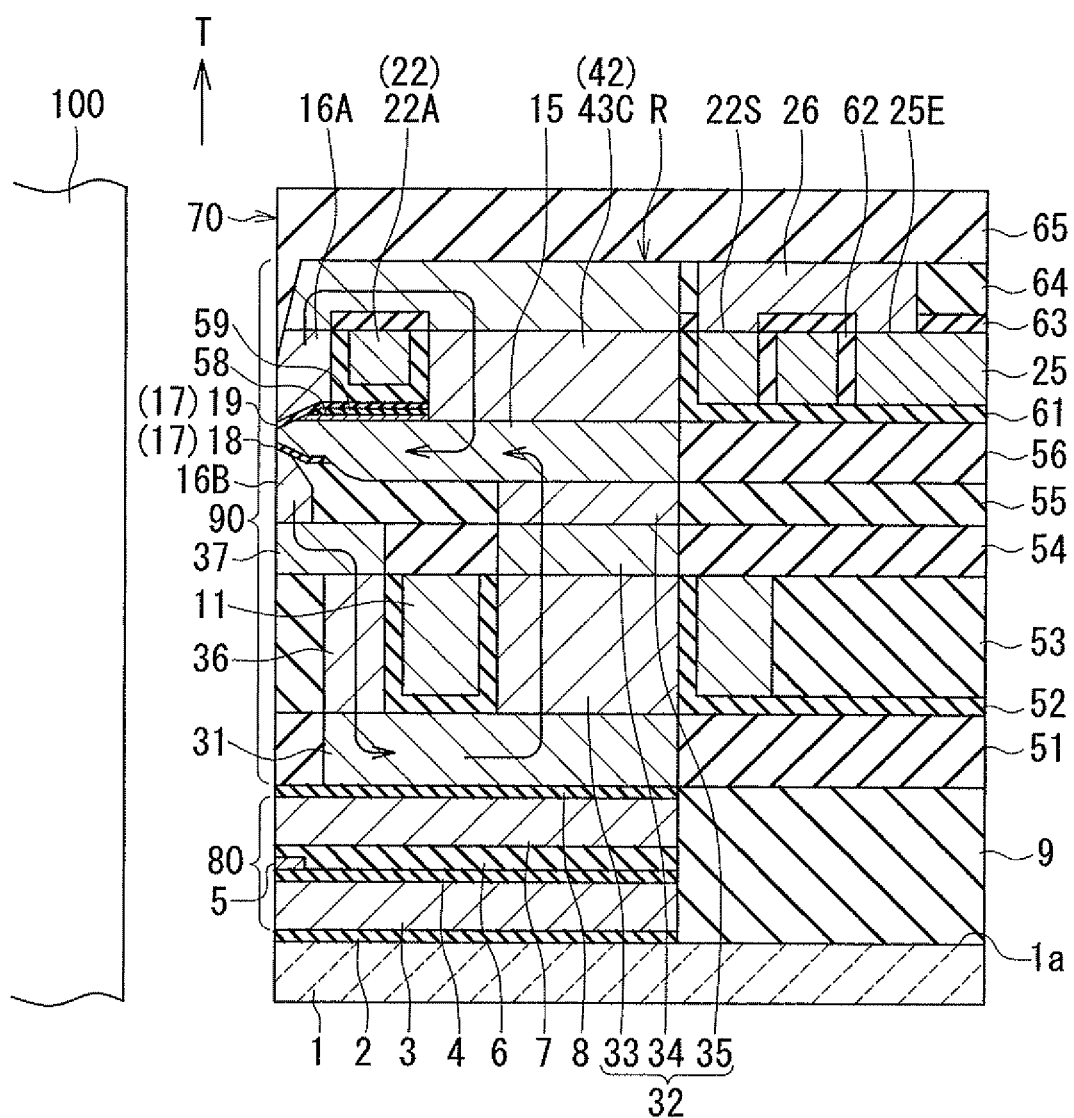
FIG. 6 is a cross-sectional view showing a magnetic head according to a third embodiment of the invention.
Figure 7:
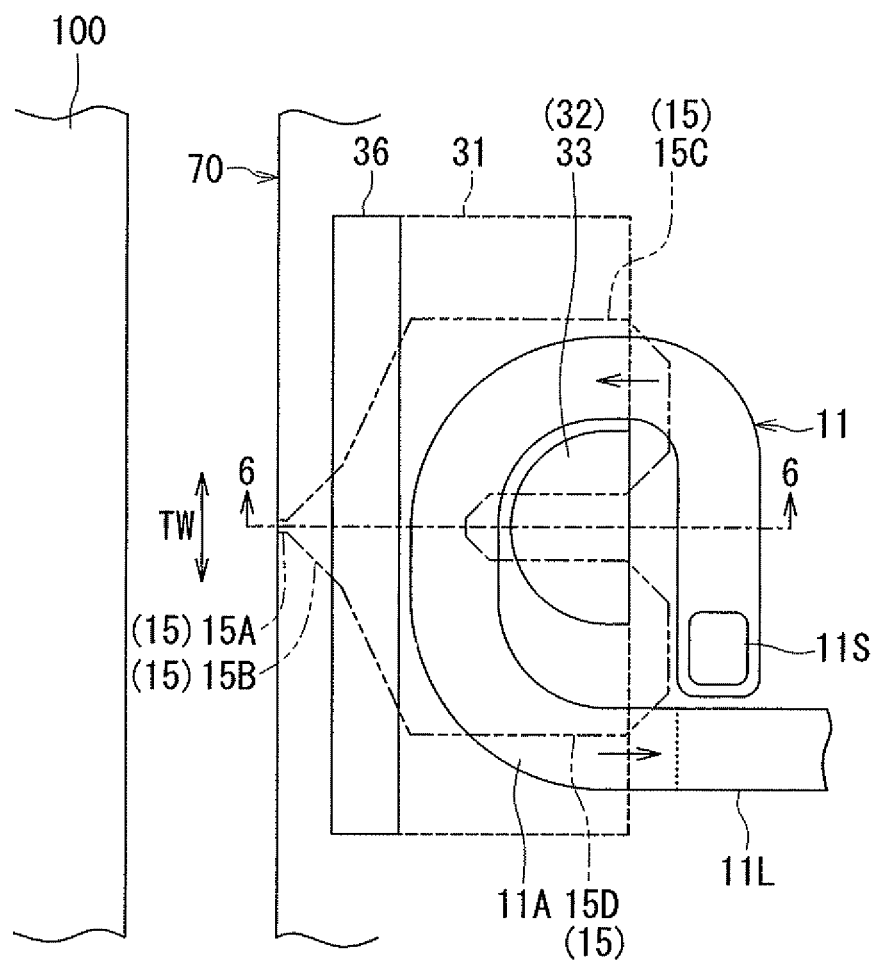
FIG. 7 is a plan view showing a second portion of a coil of the magnetic head according to the third embodiment of the invention.
Figure 8:
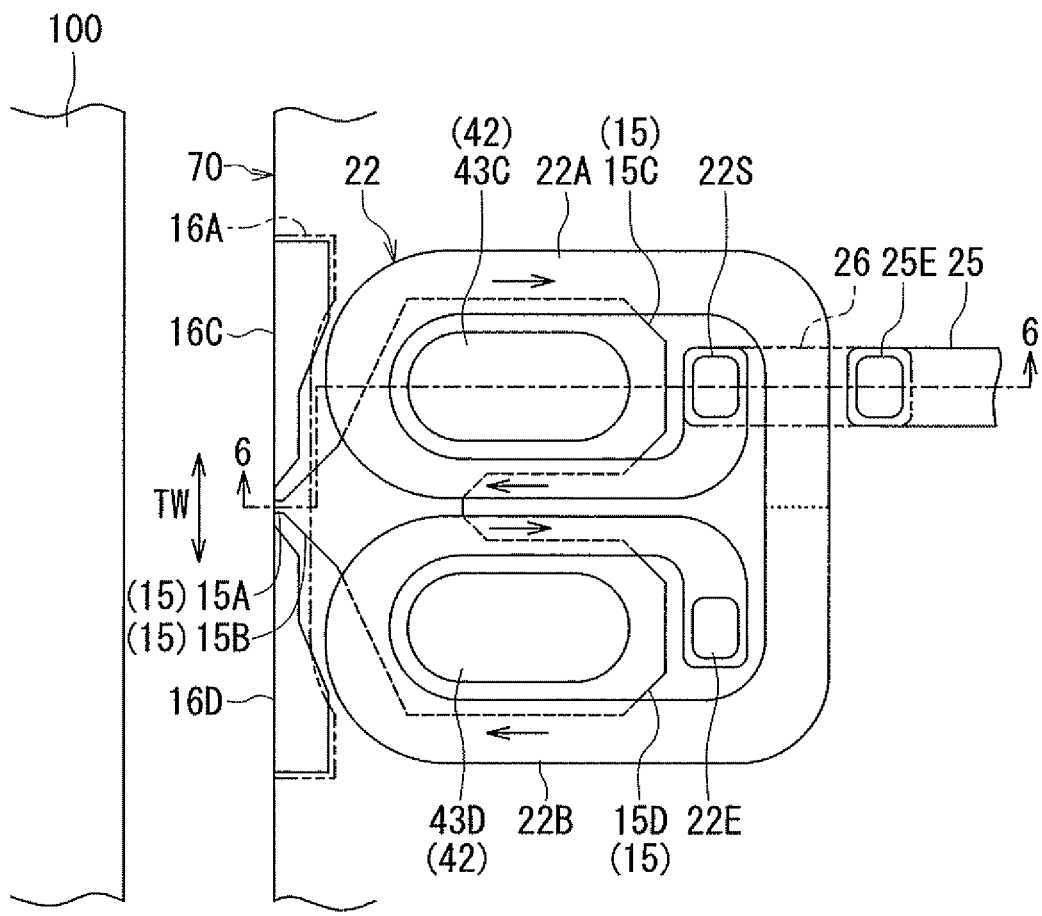
FIG. 8 is a plan view showing a first portion of the coil of the magnetic head according to the third embodiment of the invention.

A magnetic head according to a third embodiment of the invention will now be described with reference to FIG. 6 to FIG. 8. FIG. 6 is a cross-sectional view showing the magnetic head according to the present embodiment. FIG. 7 is a plan view showing a second portion of the coil of the magnetic head according to the present embodiment. FIG. 8 is a plan view showing a first portion of the coil of the magnetic head according to the present embodiment. Note that a portion of the view of FIG. 6 closer to the substrate 1 relative to the main pole 15 shows a cross section taken at the position indicated by line 6-6 of FIG. 7, and the remaining portion of the view of FIG. 6 shows a cross section taken at the position indicated by line 6-6 of FIG. 8.

The magnetic head according to the present embodiment is different from the magnetic head according to the first embodiment in the following ways. In the magnetic head according to the present embodiment, the main pole 15 includes not only the track width defining portion 15A and the wide portion 15B but also two branch portions 15C and 15D connected to the rear end portion of the wide portion 15B. The two branch portions 15C and 15D are arranged side by side in the track width direction TW with spacing therebetween. The top surface of the main pole 15 includes the top surfaces of the branch portions 15C and 15D in addition to the top surfaces of the track width defining portion 15A and the wide portion 15B. The width of the top surface of each of the branch portions 15C and 15D in the track width direction TW is smaller than ½ the maximum width of the top surface of the wide portion 15B in the track width direction TW.

Further, in the present embodiment, as shown in FIG. 8, the first coupling part 42 of the return path section R includes two magnetic path portions 43C and 43D as the plurality of magnetic path portions 43. The magnetic path portion 43C is located on the branch portion 15C of the main pole 15. The magnetic path portion 43D is located on the branch portion 15D of the main pole 15. The magnetic path portions 43C and 43D are aligned in the track width direction TW. As shown in FIG. 8, part of each of the magnetic path portions 43C and 43D may also be located on the wide portion 15B of the main pole 15.

Further, in the present embodiment, the coil includes a first portion 22 in place of the first portion 21 of the first embodiment. The positional relationship of the first portion 22 with the main pole 15, the write shield 16 and the return path section R is the same as that of the first portion 21 of the first embodiment. The plurality of magnetic path portions 43 separate a magnetic flux corresponding to the magnetic field produced by the first portion 22 into a plurality of fluxes and allow the fluxes to pass therethrough in parallel. The insulating film 61 and the insulating layers 62 and 63 are disposed around the first portion 22.

The first portion 22 includes two winding portions 22A and 22B. The winding portion 22A is disposed around the magnetic path portion 43C. The winding portion 22B is contiguous with the winding portion 22A and disposed around the magnetic path portion 43D. In FIG. 8, the boundary between the winding portion 22A and the winding portion 22B is shown by a dotted line. The winding portion 22A is wound approximately one turn around the magnetic path portion 43C. The winding portion 22B is wound approximately one turn around the magnetic path portion 43D.

In the present embodiment, the magnetic path portions 43C and 43D are the specific magnetic path portions, and the winding portions 22A and 22B are the specific winding portions. The specific winding portion 22A passes between the specific magnetic path portion 43C and the medium facing surface 70 only once, and the specific winding portion 22B passes between the specific magnetic path portion 43D and the medium facing surface 70 only once.

The winding portion 22A has a coil connection part 22S electrically connected to the lead layer 26. The winding portion 22B has a coil connection part 22E electrically connected to the coil connection part 11S of the second portion 11. As viewed from above, the winding portion 22A is wound in a clockwise direction from the coil connection part 22S toward the boundary between the winding portions 22A and 22B. As viewed from above, the winding portion 22B is wound in a clockwise direction from the boundary between the winding portions 22A and 22B toward the coil connection part 22E.

The coil connection part 22E is electrically connected to the coil connection part 11S via a non-illustrated connection layer that penetrates a plurality of layers interposed between the first portion 22 and the second portion 11. In the present embodiment, as shown in FIG. 7, the location of the coil connection part 11S is different from that in the example of the first embodiment shown in FIG. 3. In the example shown in FIG. 7 and FIG. 8, the first portion 22 and the second portion 11 are connected in series.

In the present embodiment, the lead layer 25 is located farther from the medium facing surface 70 than is the first portion 22. As shown in FIG. 6, the insulating layer 63 has an opening for exposing the coil connection part 22S of the winding portion 22A and an opening for exposing the connection part 25E of the lead layer 25. The lead layer 26 is electrically connected to the coil connection part 22S and the connection part 25E through these openings.

As shown in FIG. 6 and FIG. 7, the magnetic layer 33 of the second coupling part 32 of the return path section R is smaller in length in a direction perpendicular to the medium facing surface 70 when compared with the example of the first embodiment shown in FIG. 1 and FIG. 3. Further, although not illustrated, the magnetic layer 35 of the second coupling part 32 may be greater than the magnetic layer 33 in width in the track width direction TW. The top surface of the magnetic layer 35 is in contact with portions of the bottom end of the main pole 15 that are included in the branch portions 15C and 15D.

The remainder of configuration, function and effects of the present embodiment are similar to those of the first embodiment.

Fourth Embodiment

Figure 9:
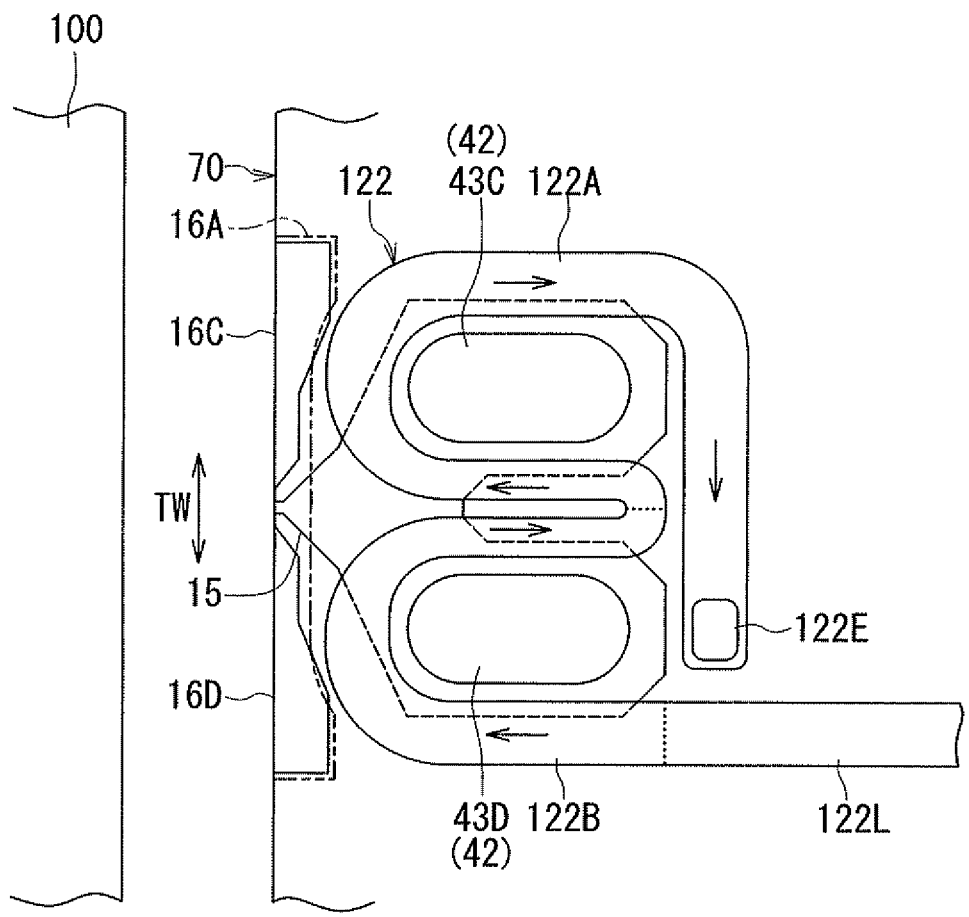
FIG. 9 is a plan view showing a first portion of a coil of a magnetic head according to a fourth embodiment of the invention.

A magnetic head according to a fourth embodiment of the invention will now be described with reference to FIG. 9. FIG. 9 is a plan view showing a first portion of the coil of the magnetic head according to the present embodiment. The magnetic head according to the present embodiment is different from the magnetic head according to the third embodiment in the following ways. The magnetic head according to the present embodiment does not have the lead layers 25 and 26.

Further, in the present embodiment, the coil includes a first portion 122 in place of the first portion 22 of the third embodiment. The positional relationship of the first portion 122 with the main pole 15, the write shield 16 and the return path section R is the same as that of the first portion 22 of the third embodiment. The plurality of magnetic path portions 43 of the return path section. R separate a magnetic flux corresponding to the magnetic field produced by the first portion 122 into a plurality of fluxes and allow the fluxes to pass therethrough in parallel. The insulating film 61 and the insulating layers 62 and 63 (see FIG. 6) are disposed around the first portion 122.

The first portion 122 includes two winding portions 122A and 122B and a lead portion 122L. The winding portion 122A is disposed around the magnetic path portion 43C. The winding portion 122B is contiguous with the winding portion 122A and disposed around the magnetic path portion 43D. The lead portion 122L is contiguous with the winding portion 122B. In FIG. 9, the boundaries between these portions are shown by dotted lines. The winding portion 122A is wound approximately one turn around the magnetic path portion 43C. The winding portion 122B is wound approximately one turn around the magnetic path portion 43D.

In the present embodiment, the winding portions 122A and 122B are the specific winding portions. The specific winding portion 122A passes between the specific magnetic path portion 43C and the medium facing surface 70 only once, and the specific winding portion 122B passes between the specific magnetic path portion 43D and the medium facing surface 70 only once.

The winding portion 122A has a coil connection part 122E electrically connected to the coil connection part 11S (see FIG. 7) of the second portion 11. As viewed from above, the winding portion 122A is wound in a clockwise direction from the boundary between the winding portions 122A and 122B toward the coil connection part 122E. As viewed from above, the winding portion 122B is wound in a clockwise direction from the boundary between the winding portion 122B and the lead portion 122L toward the boundary between the winding portions 122A and 122B.

The coil connection part 122E is electrically connected to the coil connection part 11S via a non-illustrated connection layer that penetrates a plurality of layers interposed between the first portion 122 and the second portion 11. In the example shown in FIG. 7 and FIG. 9, the first portion 122 and the second portion 11 are connected in series.

The remainder of configuration, function and effects of the present embodiment are similar to those of the third embodiment.

Fifth Embodiment

Figure 10:
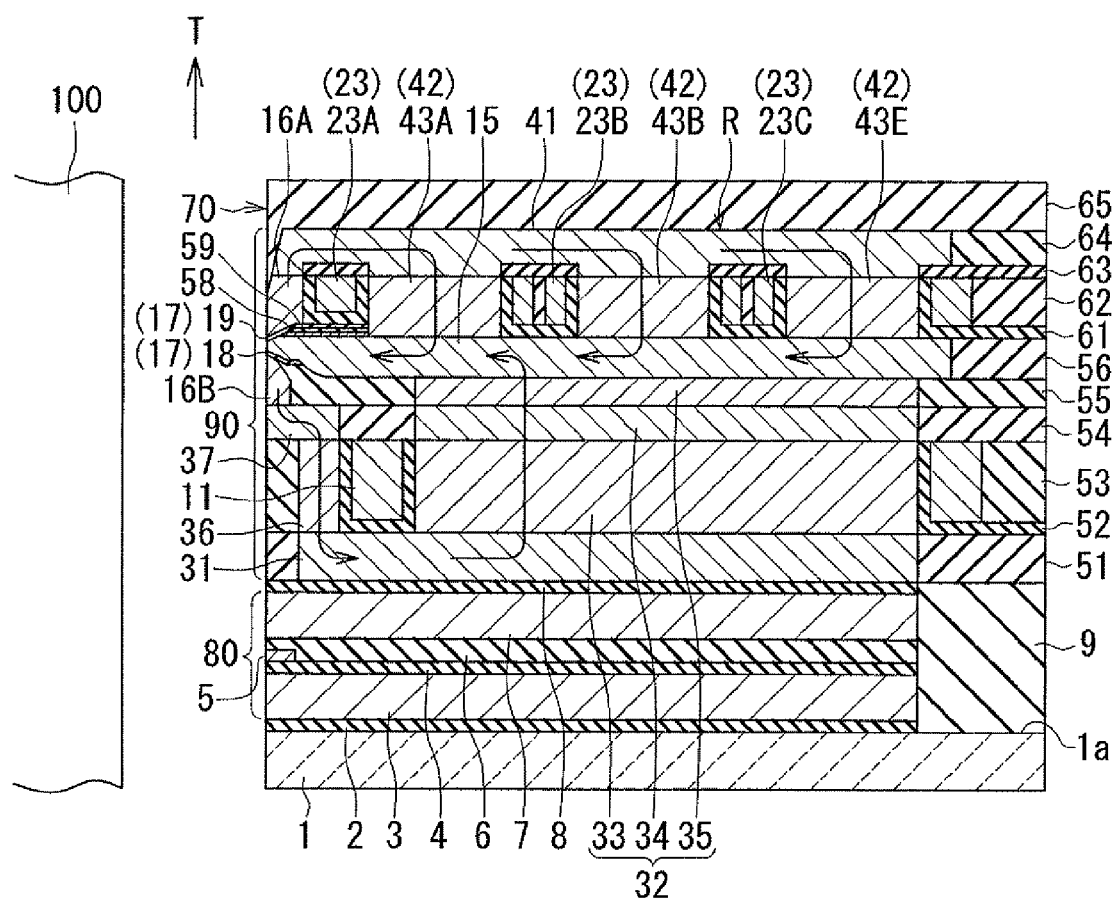
FIG. 10 is a cross-sectional view showing a magnetic head according to a fifth embodiment of the invention.
Figure 11:
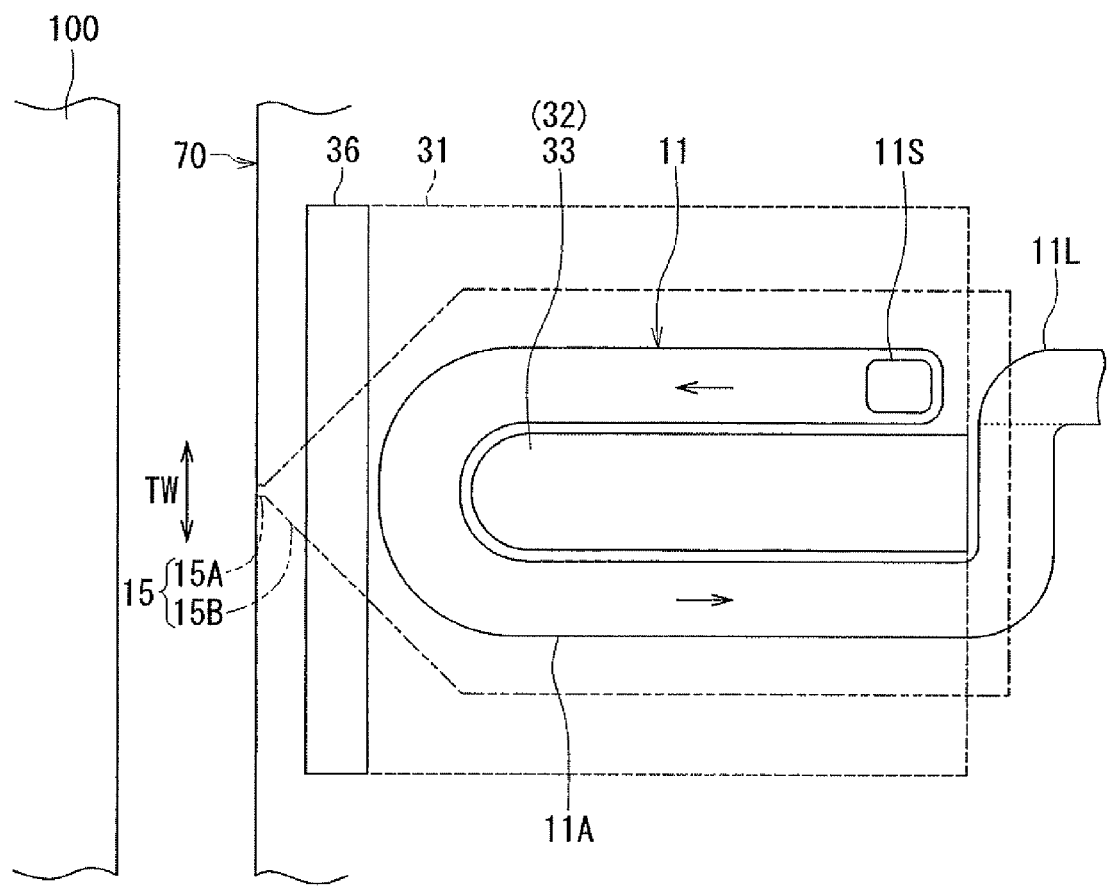
FIG. 11 is a plan view showing a second portion of a coil of the magnetic head according to the fifth embodiment of the invention.
Figure 12:
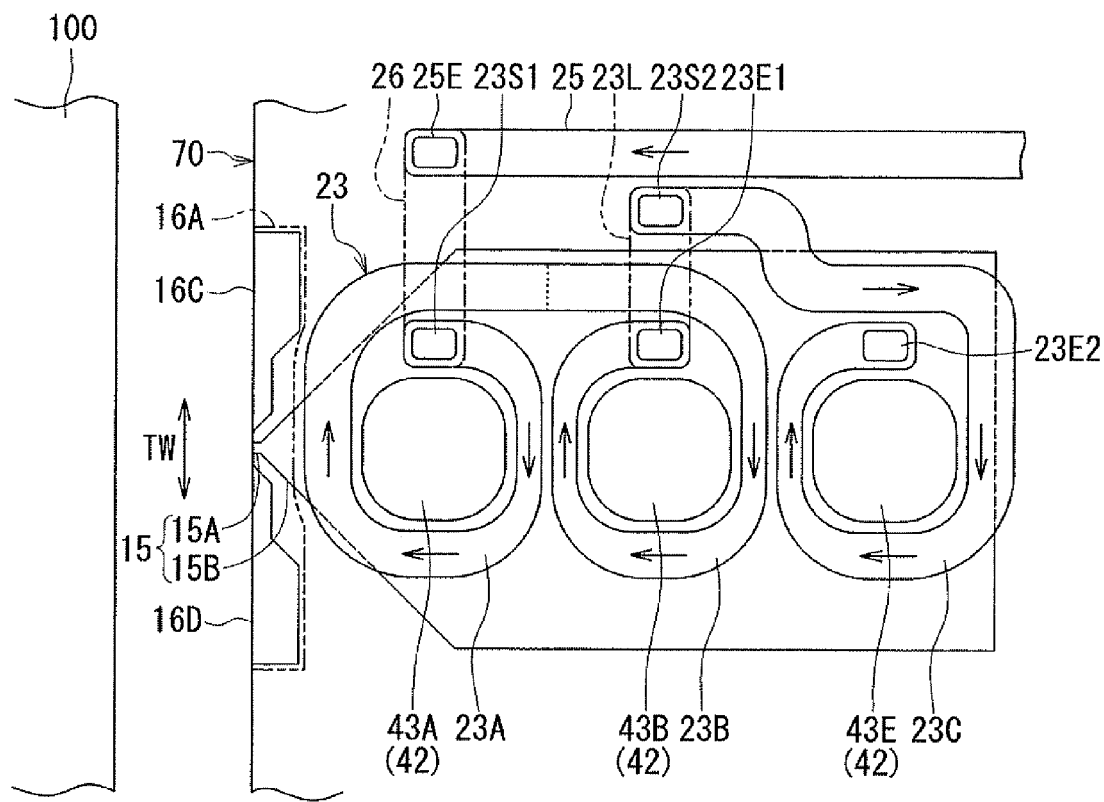
FIG. 12 is a plan view showing a first portion of the coil of the magnetic head according to the fifth embodiment of the invention.

A magnetic head according to a fifth embodiment of the invention will now be described with reference to FIG. 10 to FIG. 12. FIG. 10 is a cross-sectional view showing the magnetic head according to the present embodiment. FIG. 10 shows the main cross section. FIG. 11 is a plan view showing a second portion of the coil of the magnetic head according to the present embodiment. FIG. 12 is a plan view showing a first portion of the coil of the magnetic head according to the present embodiment.

The magnetic head according to the present embodiment is different from the magnetic head according to the first embodiment in the following ways. In the magnetic head according to the present embodiment, the first coupling part 42 of the return path section R includes three magnetic path portions 43A, 43B, and 43E as the plurality of magnetic path portions 43. The magnetic path portions 43A and 43B are disposed in the same manner as in the first embodiment. The magnetic path portion 43E is located farther from the medium facing surface 70 than is the magnetic path portion 43B. The three magnetic path portions 43A, 43B, and 43E are aligned in a direction perpendicular to the medium facing surface 70.

Further, in the present embodiment, the coil includes a first portion 23 in place of the first portion 21 of the first embodiment. The positional relationship of the first portion 23 with the main pole 15, the write shield 16 and the return path section R is the same as that of the first portion 21 of the first embodiment. The plurality of magnetic path portions 43 separate a magnetic flux corresponding to the magnetic field produced by the first portion 23 into a plurality of fluxes and allow the fluxes to pass therethrough in parallel. The insulating film 61 and the insulating layers 62 and 63 are disposed around the first portion 23.

The first portion 23 includes three winding portions 23A, 23B and 23C, and a lead portion 23L. The winding portion 23A is disposed around the magnetic path portion 43A. The winding portion 23B is contiguous with the winding portion 23A and disposed around the magnetic path portion 43B. In FIG. 12, the boundary between the winding portion 23A and the winding portion 23B is shown by a dotted line. The winding portion 23C is disposed around the magnetic path portion 43E. The lead portion 23L electrically connects the winding portion 23B and the winding portion 23C to each other. The winding portion 23A is wound approximately one turn around the magnetic path portion 43A. The winding portion 23B is wound approximately one turn around the magnetic path portion 43B. The winding portion 23C is wound approximately one turn around the magnetic path portion 43E.

In the present embodiment, the winding portion 23A is the specific winding portion. The specific winding portion 23A passes between the specific magnetic path portion 43A and the medium facing surface 70 only once.

The winding portion 23A has a coil connection part 23S1 electrically connected to the lead layer 26. The winding portion 23B has a coil connection part 23E1 electrically connected to one end of the lead portion 23L. The winding portion 23C has a coil connection part 23S2 electrically connected to the other end of the lead portion 23L, and a coil connection part 23E2 electrically connected to the coil connection part 11S of the second portion 11. As viewed from above, the winding portion 23A is wound in a clockwise direction from the coil connection part 23S1 toward the boundary between the winding portions 23A and 23B. As viewed from above, the winding portion 23B is wound in a clockwise direction from the boundary between the winding portions 23A and 23B toward the coil connection part 23E1. As viewed from above, the winding portion 23C is wound in a clockwise direction from the coil connection part 23S2 toward the coil connection part 23E2.

In the present embodiment, the insulating layer 63 has three openings for exposing the coil connection parts 23S1, 23E1 and 23S2, and an opening for exposing the connection part 25E of the lead layer 25. The lead portion 23L is electrically connected to the coil connection parts 23E1 and 23S2 through these openings. The lead layer 26 is electrically connected to the coil connection part 23S1 and the connection part 25E through these openings.

The coil connection part 23E2 is electrically connected to the coil connection part 11S via a non-illustrated connection layer that penetrates a plurality of layers interposed between the first portion 23 and the second portion 11. In the present embodiment, as shown in FIG. 11, the location of the coil connection part 11S is different from that in the example of the first embodiment shown in FIG. 3. Further, as shown in FIG. 10 and FIG. 11, the magnetic layer 33 of the second coupling part 32 of the return path section R is greater in length in a direction perpendicular to the medium facing surface 70 when compared with the example of the first embodiment shown in FIG. 1 and FIG. 3.

In the present embodiment, the total number of turns of the winding portions 23A to 23C of the first portion 23 is approximately three, being greater than the total number of turns of the winding portions 21A and 21B of the first portion 21 of the first embodiment. According to the present embodiment, it is thus possible to increase the magnetomotive force produced by the coil to allow the main pole 15 to produce a write magnetic field of greater magnitude.

The remainder of configuration, function and effects of the present embodiment are similar to those of the first embodiment.

Sixth Embodiment

Figure 13:
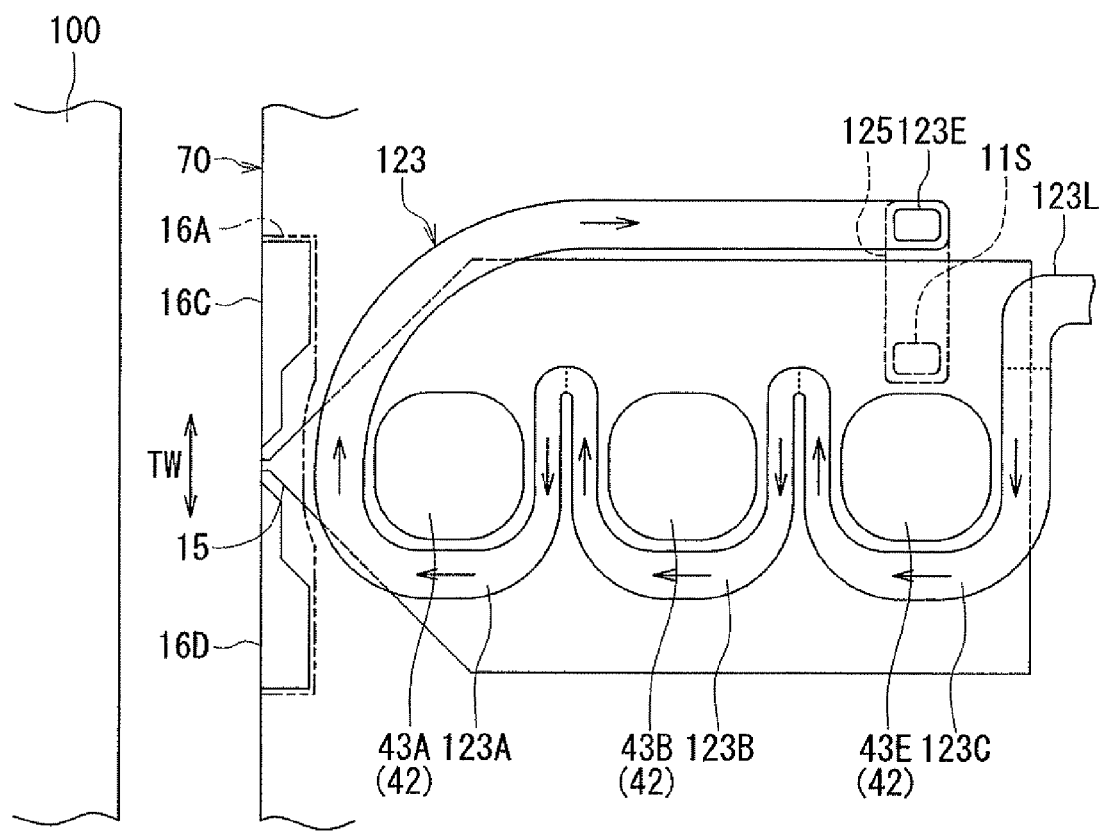
FIG. 13 is a plan view showing a first portion of a coil of a magnetic head according to a sixth embodiment of the invention.

A magnetic head according to a sixth embodiment of the invention will now be described with reference to FIG. 13. FIG. 13 is a plan view showing a first portion of the coil of the magnetic head according to the present embodiment. The magnetic head according to the present embodiment is different from the magnetic head according to the fifth embodiment in the following ways. The magnetic head according to the present embodiment has the lead layer 125 described in the second embodiment section, in place of the lead layers 25 and 26 of the fifth embodiment.

Further, in the present embodiment, the coil includes a first portion 123 in place of the first portion 23 of the fifth embodiment. The positional relationship of the first portion 123 with the main pole 15, the write shield 16 and the return path section R is the same as that of the first portion 23 of the fifth embodiment. The plurality of magnetic path portions 43 separate a magnetic flux corresponding to the magnetic field produced by the first portion 123 into a plurality of fluxes and allow the fluxes to pass therethrough in parallel. The insulating film 61 and the insulating layers 62 and 63 (see FIG. 10) are disposed around the first portion 123.

The first portion 123 includes three winding portions 123A, 123B and 123C, and a lead portion 123L. The winding portion 123A is disposed around the magnetic path portion 43A. The winding portion 123B is contiguous with the winding portion 123A and disposed around the magnetic path portion 43B. The winding portion 123C is contiguous with the winding portion 123B and disposed around the magnetic path portion 43E. The lead portion 123L is contiguous with the winding portion 123C. In FIG. 13, the boundaries between these portions are shown by dotted lines. The winding portion 123A is wound approximately one turn around the magnetic path portion 43A. The winding portion 123B is wound approximately one turn around the magnetic path portion 43B. The winding portion 123C is wound approximately one turn around the magnetic path portion 43E.

In the present embodiment, the winding portion 123A is the specific winding portion. The specific winding portion 123A passes between the specific magnetic path portion 43A and the medium facing surface 70 only once.

The winding portion 123A has a coil connection part 123E electrically connected to the lead layer 125. As viewed from above, the winding portion 123A is wound in a clockwise direction from the boundary between the winding portions 123A and 123B toward the coil connection part 123E. As viewed from above, the winding portion 123B is wound in a clockwise direction from the boundary between the winding portions 123B and 123C toward the boundary between the winding portions 123A and 123B. As viewed from above, the winding portion 123C is wound in a clockwise direction from the boundary between the winding portion 123C and the lead portion 123L toward the boundary between the winding portions 123B and 123C.

The coil connection part 123E is electrically connected to the lead layer 125 via a non-illustrated connection layer that penetrates a plurality of layers interposed between the first portion 123 and the lead layer 125. In the example shown in FIG. 13, the first portion 123 and the second portion 11 are connected in series.

The remainder of configuration, function and effects of the present embodiment are similar to those of the second or fifth embodiment.

Seventh Embodiment

Figure 14:
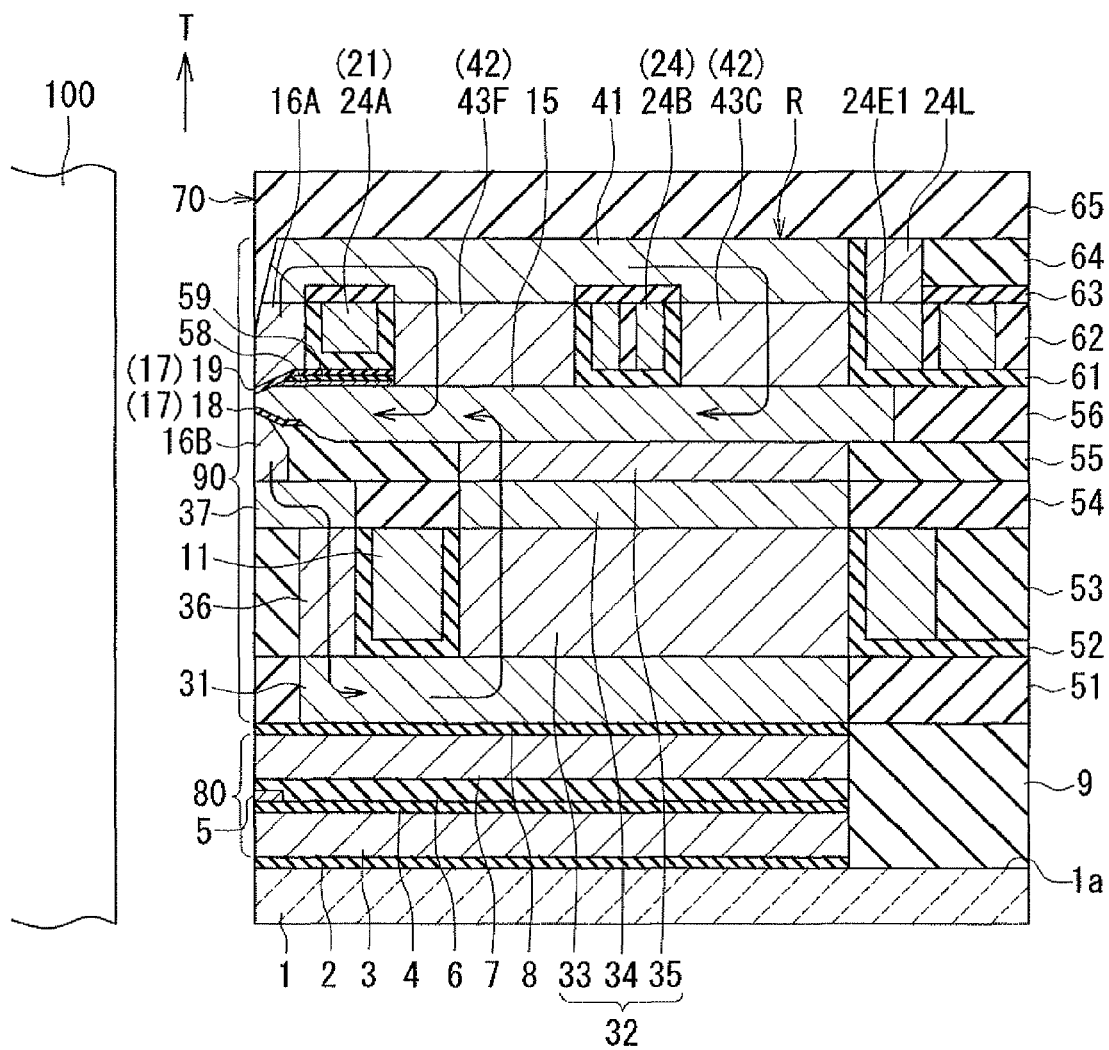
FIG. 14 is a cross-sectional view showing a magnetic head according to a seventh embodiment of the invention.
Figure 15:
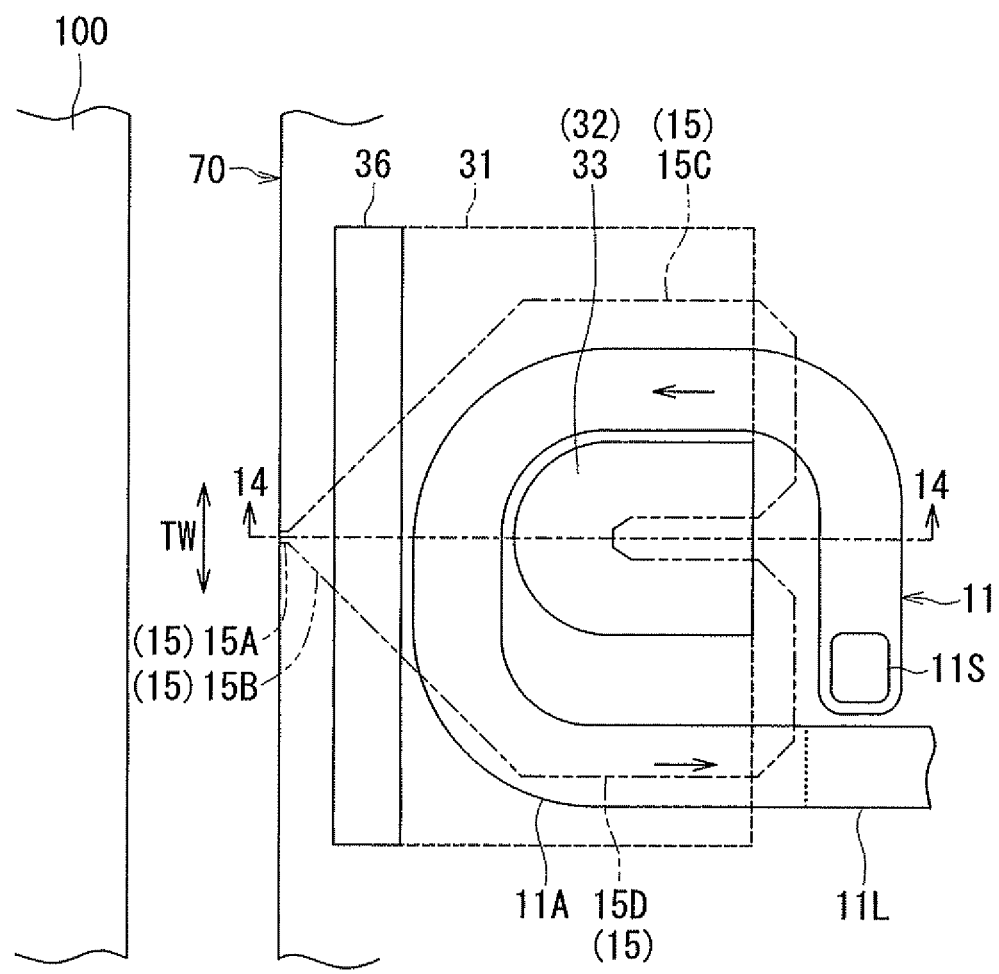
FIG. 15 is a plan view showing a second portion of a coil of the magnetic head according to the seventh embodiment of the invention.
Figure 16:
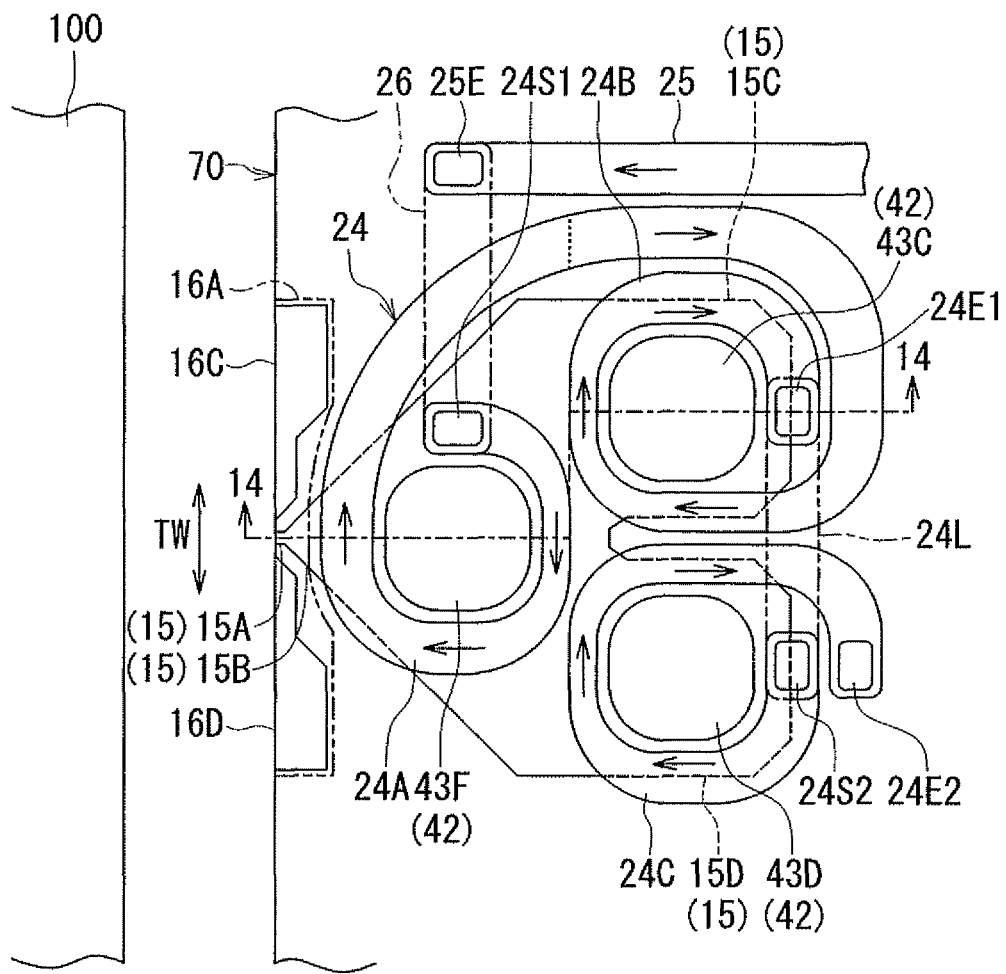
FIG. 16 is a plan view showing a first portion of the coil of the magnetic head according to the seventh embodiment of the invention.

A magnetic head according to a seventh embodiment of the invention will now be described with reference to FIG. 14 to FIG. 16. FIG. 14 is a cross-sectional view showing the magnetic head according to the present embodiment. FIG. 15 is a plan view showing a second portion of the coil of the magnetic head according to the present embodiment. FIG. 16 is a plan view showing a first portion of the coil of the magnetic head according to the present embodiment. Note that a portion of the view of FIG. 14 closer to the substrate 1 relative to the main pole 15 shows a cross section taken at the position indicated by line 14-14 of FIG. 15, and the remaining portion of the view of FIG. 14 shows a cross section taken at the position indicated by line 14-14 of FIG. 16.

The magnetic head according to the present embodiment is different from the magnetic head according to the third embodiment in the following ways. In the magnetic head according to the present embodiment, the first coupling part 42 of the return path section R includes three magnetic path portions 43C, 43D, and 43F as the plurality of magnetic path portions 43. The magnetic path portion 43F is located on the wide portion 15B of the main pole 15. The magnetic path portion 43C is located on the branch portion 15C of the main pole 15. The magnetic path portion 43D is located on the branch portion 15D of the main pole 15. The magnetic path portions 43C and 43D are aligned in the track width direction TW.

Further, in the present embodiment, the coil includes a first portion 24 in place of the first portion 22 of the third embodiment. The positional relationship of the first portion 24 with the main pole 15, the write shield 16 and the return path section R is the same as that of the first portion 22 of the third embodiment. The plurality of magnetic path portions 43 of the return path section R separate a magnetic flux corresponding to the magnetic field produced by the first portion 24 into a plurality of fluxes and allow the fluxes to pass therethrough in parallel. The insulating film 61 and the insulating layers 62 and 63 are disposed around the first portion 24.

The first portion 24 includes three winding portions 24A, 24B and 24C, and a lead portion 24L. The winding portion 24A is disposed around the magnetic path portion 43F. The winding portion 24B is contiguous with the winding portion 24A and disposed around the magnetic path portion 43C. In FIG. 16, the boundary between the winding portion 24A and the winding portion 24B is shown by a dotted line. The winding portion 24C is disposed around the magnetic path portion 43D. The lead portion 24L electrically connects the winding portion 24B and the winding portion 24C to each other. The winding portion 24A is wound approximately one turn around the magnetic path portion 43F. The winding portion 24B is wound approximately one turn around the magnetic path portion 43C. The winding portion 24C is wound approximately one turn around the magnetic path portion 43D.

In the present embodiment, the magnetic path portion 43F is the specific magnetic path portion, and the winding portion 24A is the specific winding portion. The specific winding portion 24A passes between the specific magnetic path portion 43F and the medium facing surface 70 only once.

The winding portion 24A has a coil connection part 24S1 electrically connected to the lead layer 26. The winding portion 24B has a coil connection part 24E1 electrically connected to one end of the lead portion 24L. The winding portion 24C has a coil connection part 24S2 electrically connected to the other end of the lead portion 24L, and a coil connection part 24E2 electrically connected to the coil connection part 11S of the second portion 11. As viewed from above, the winding portion 24A is wound in a clockwise direction from the coil connection part 24S1 toward the boundary between the winding portions 24A and 24B. As viewed from above, the winding portion 24B is wound in a clockwise direction from the boundary between the winding portions 24A and 24B toward the coil connection part 24E1. As viewed from above, the winding portion 24C is wound in a clockwise direction from the coil connection part 24S2 toward the coil connection part 24E2.

In the present embodiment, the insulating layer 63 has three openings for exposing the coil connection parts 24S1, 24E1 and 24S2, and an opening for exposing the connection part 25E of the lead layer 25. The lead portion 24L is electrically connected to the coil connection parts 24E1 and 24S2 through these openings. The lead layer 26 is electrically connected to the coil connection part 24S1 and the connection part 25E through these openings.

The coil connection part 24E2 is electrically connected to the coil connection part 11S via a non-illustrated connection layer that penetrates a plurality of layers interposed between the first portion 24 and the second portion 11. In the present embodiment, as shown in FIG. 14 and FIG. 15, the magnetic layer 33 of the second coupling part 32 of the return path section R is greater in length in a direction perpendicular to the medium facing surface 70 when compared with the example of the third embodiment shown in FIG. 6 and FIG. 7.

In the present embodiment, the total number of turns of the winding portions 24A to 24C of the first portion 24 is approximately three, being greater than the total number of turns of the winding portions 22A and 22B of the first portion 22 of the third embodiment. According to the present embodiment, it is thus possible to increase the magnetomotive force produced by the coil to allow the main pole 15 to produce a write magnetic field of greater magnitude.

The remainder of configuration, function and effects of the present embodiment are similar to those of the third embodiment.

Eighth Embodiment

Figure 17:
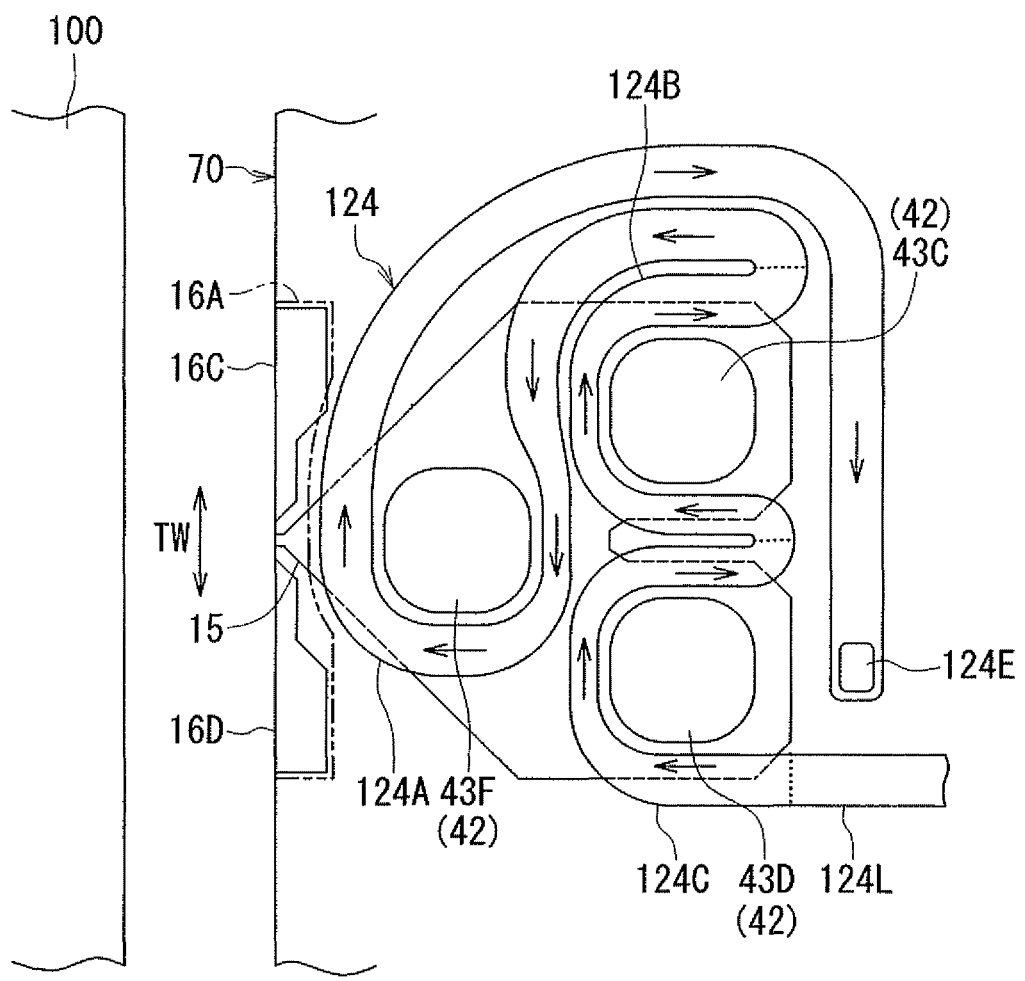
FIG. 17 is a plan view showing a first portion of a coil of a magnetic head according to an eighth embodiment of the invention.

A magnetic head according to an eighth embodiment of the invention will now be described with reference to FIG. 17. FIG. 17 is a plan view showing a first portion of the coil of the magnetic head according to the present embodiment. The magnetic head according to the present embodiment is different from the magnetic head according to the seventh embodiment in the following ways. The magnetic head according to the present embodiment does not have the lead layers 25 and 26.

Further, in the present embodiment, the coil includes a first portion 124 in place of the first portion 24 of the seventh embodiment. The positional relationship of the first portion 124 with the main pole 15, the write shield 16 and the return path section R is the same as that of the first portion 24 of the seventh embodiment. The plurality of magnetic path portions 43 of the return path section R separate a magnetic flux corresponding to the magnetic field produced by the first portion 124 into a plurality of fluxes and allow the fluxes to pass therethrough in parallel. The insulating film 61 and the insulating layers 62 and 63 (see FIG. 14) are disposed around the first portion 124.

The first portion 124 includes three winding portions 124A, 124B and 124C, and a lead portion 124L. The winding portion 124A is disposed around the magnetic path portion 43F. The winding portion 124B is contiguous with the winding portion 124A and disposed around the magnetic path portion 43C. The winding portion 124C is contiguous with the winding portion 124B and disposed around the magnetic path portion 43D. The lead portion 124L is contiguous with the winding portion 124C. In FIG. 17, the boundaries between these portions are shown by dotted lines. The winding portion 124A is wound approximately one turn around the magnetic path portion 43F. The winding portion 124B is wound approximately one turn around the magnetic path portion 43C. The winding portion 124C is wound approximately one turn around the magnetic path portion 43D.

In the present embodiment, the winding portion 124A is the specific winding portion. The specific winding portion 124A passes between the specific magnetic path portion 43F and the medium facing surface 70 only once.

The winding portion 124A has a coil connection part 124E electrically connected to the coil connection part 11S (see FIG. 15) of the second portion 11. As viewed from above, the winding portion 124A is wound in a clockwise direction from the boundary between the winding portions 124A and 124B toward the coil connection part 124E. As viewed from above, the winding portion 124B is wound in a clockwise direction from the boundary between the winding portions 124B and 124C toward the boundary between the winding portions 124A and 124B. As viewed from above, the winding portion 124C is wound in a clockwise direction from the boundary between the winding portion 124C and the lead portion 124L toward the boundary between the winding portions 124B and 124C.

The coil connection part 124E is electrically connected to the coil connection part 11S via a non-illustrated connection layer that penetrates a plurality of layers interposed between the first portion 124 and the second portion 11. In the example shown in FIG. 15 and FIG. 17, the first portion 124 and the second portion 11 are connected in series.

The remainder of configuration, function and effects of the present embodiment are similar to those of the seventh embodiment.

The present invention is not limited to the foregoing embodiments, and various modifications may be made thereto. For example, as far as the requirements of the appended claims are met, the number and the shapes of the plurality of magnetic path portions 43 of the first coupling part 42 and those of the plurality of winding portions of the coil are not limited to the examples illustrated in the foregoing embodiments, and can be chosen as desired.

Further, the magnetic head of the present invention may be provided with means for applying heat to the recording medium 100 to serve as a thermally-assisted magnetic recording head.

It is apparent that the present invention can be carried out in various forms and modifications in the light of the foregoing descriptions. Accordingly, within the scope of the following claims and equivalents thereof, the present invention can be carried out in forms other than the foregoing most preferable embodiments.

What is claimed is:

1. A magnetic head for perpendicular magnetic recording, comprising:
   a medium facing surface facing a recording medium;
   a coil producing a magnetic field corresponding to data to be written on the recording medium;
   a main pole having an end face located in the medium facing surface, the main pole allowing a magnetic flux that corresponds to the magnetic field produced by the coil to pass, and producing a write magnetic field for writing the data on the recording medium by means of a perpendicular magnetic recording system;
   a write shield made of a magnetic material and having an end face located in the medium facing surface;
   a gap part made of a nonmagnetic material and interposed between the main pole and the write shield; and
   a return path section made of a magnetic material and connecting the write shield and part of the main pole away from the medium facing surface to each other, wherein
   the end face of the write shield includes a first end face portion located on a front side in a direction of travel of the recording medium relative to the end face of the main pole,
   the return path section includes a first yoke layer located on the front side in the direction of travel of the recording medium relative to the main pole, and a first coupling part coupling the main pole and the first yoke layer to each other,
   the first coupling part includes a plurality of magnetic path portions that separate the magnetic flux into a plurality of fluxes and allow the fluxes to pass therethrough in parallel, and
   the coil includes a plurality of winding portions each of which is disposed around a different one of the plurality of magnetic path portions, the plurality of magnetic path portions and the plurality of winding portions being in a same plane perpendicular to the direction of travel of the recording medium.

2. The magnetic head for perpendicular magnetic recording according to claim 1, wherein the plurality of magnetic path portions intersect a cross section perpendicular to the direction of travel of the recording medium.

3. The magnetic head for perpendicular magnetic recording according to claim 1, wherein
   at least one of the plurality of magnetic path portions is a specific magnetic path portion which is closest to the medium facing surface,
   at least one of the plurality of winding portions is a specific winding portion which is disposed around the specific magnetic path portion, and
   the specific winding portion passes between the specific magnetic path portion and the medium facing surface only once.

4. The magnetic head for perpendicular magnetic recording according to claim 1, wherein
   the return path section further includes a second yoke layer located on a rear side in the direction of travel of the recording medium relative to the main pole, and a second coupling part coupling the main pole and the second yoke layer to each other, and
   the coil further includes a winding portion disposed around the second coupling part.

5. The magnetic head for perpendicular magnetic recording according to claim 1, wherein the end face of the write shield further includes a second end face portion located on a rear side in the direction of travel of the recording medium relative to the end face of the main pole.

6. The magnetic head for perpendicular magnetic recording according to claim 5, wherein the end face of the write shield further includes third and fourth end face portions located on opposite sides of the end face of the main pole in a track width direction.

7. The magnetic head for perpendicular magnetic recording according to claim 1, wherein at least two of the plurality of magnetic path portions are aligned in a direction perpendicular to the medium facing surface.

8. The magnetic head for perpendicular magnetic recording according to claim 1, wherein at least two of the plurality of magnetic path portions are aligned in a track width direction.

* * * * *